(12) United States Patent
Bruch et al.

(10) Patent No.: US 10,862,315 B2
(45) Date of Patent: Dec. 8, 2020

(54) DEVICE AND METHOD FOR SUPPLYING ENERGY TO A PLURALITY OF ENERGY STORAGE COMPONENTS AND/OR FOR PROVIDING ENERGY STORED WITHIN THE ENERGY STORAGE COMPONENTS

(71) Applicant: Fraunhofer-Gesellschaft zur Foerderung der angewandten Forschung e.V., Munich (DE)

(72) Inventors: Maximilian Bruch, Freiburg (DE); Matthias Vetter, Freiburg (DE); Naqqash Abbassi, Freiburg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/360,483

(22) Filed: Mar. 21, 2019

(65) Prior Publication Data
US 2019/0222032 A1 Jul. 18, 2019

Related U.S. Application Data

(63) Continuation of application No. PCT/EP2017/073686, filed on Sep. 19, 2017.

(30) Foreign Application Priority Data

Sep. 21, 2016 (DE) .......................... 10 2016 218 160

(51) Int. Cl.
*H02J 7/00* (2006.01)
*H02J 13/00* (2006.01)
*H02J 15/00* (2006.01)
*H02J 7/34* (2006.01)
*H01F 30/12* (2006.01)

(52) U.S. Cl.
CPC ............ *H02J 7/0013* (2013.01); *H01F 30/12* (2013.01); *H02J 7/00* (2013.01); *H02J 7/34* (2013.01); *H02J 13/00* (2013.01); *H02J 15/00* (2013.01)

(58) Field of Classification Search
CPC .... Y02E 60/12; G01R 31/3658; H02J 7/0021; H02J 7/0016; H02J 7/0013; H02J 7/00; H02J 7/34; H02J 13/0003; H02J 15/00; H02J 7/0022; Y02T 10/7055
See application file for complete search history.

(56) References Cited

U.S. PATENT DOCUMENTS 3,517,300 A 6/1970 Mcmurray
4,742,441 A 5/1988 Akerson
(Continued)

FOREIGN PATENT DOCUMENTS

AT 514385 A1 12/2014
CN 101262140 A 9/2008
(Continued)

*Primary Examiner* — Arun C Williams
(74) *Attorney, Agent, or Firm* — Perkins Coie LLP; Michael A. Glenn

(57) ABSTRACT

A device includes a first energy storage terminal, a second energy storage terminal, a further terminal, a shared magnetic flux guide, a first coupling mechanism, a second coupling mechanism as well as a further coupling mechanism, for supplying energy to a plurality of energy storage components and for providing energy stored within the energy storage components.

6 Claims, 11 Drawing Sheets

(56) References Cited

U.S. PATENT DOCUMENTS

| | | | |
|---|---|---|---|
| 5,994,793 A | 11/1999 | Bobry | |
| 6,058,032 A | 5/2000 | Yamanaka et al. | |
| 6,100,663 A | 8/2000 | Boys et al. | |
| 6,172,505 B1 | 1/2001 | Bertness | |
| 2003/0117109 A1 | 6/2003 | Trepka | |
| 2003/0141843 A1 | 7/2003 | Anzawa et al. | |
| 2003/0236601 A1* | 12/2003 | McLeod | G07C 5/008 701/31.4 |
| 2004/0135546 A1* | 7/2004 | Chertok | H01M 10/441 320/118 |
| 2005/0007797 A1 | 1/2005 | Zocchi et al. | |
| 2005/0040711 A1 | 2/2005 | West | |
| 2005/0077879 A1 | 4/2005 | Near | |
| 2005/0140335 A1 | 6/2005 | Lee et al. | |
| 2007/0029965 A1 | 2/2007 | Hui | |
| 2007/0145830 A1* | 6/2007 | Lee | H02J 5/005 307/135 |
| 2007/0178857 A1* | 8/2007 | Greene | H02J 7/32 455/127.1 |
| 2008/0074083 A1 | 3/2008 | Yarger et al. | |
| 2008/0191663 A1 | 8/2008 | Fowler et al. | |
| 2008/0316774 A1 | 12/2008 | Ito et al. | |
| 2010/0093401 A1* | 4/2010 | Moran | G06F 1/1626 455/566 |
| 2010/0097031 A1* | 4/2010 | King | B60L 53/11 320/109 |
| 2010/0219694 A1* | 9/2010 | Kurs | H02J 50/80 307/104 |
| 2010/0283433 A1 | 11/2010 | Oh et al. | |
| 2010/0290215 A1* | 11/2010 | Metcalf | A47B 21/00 362/127 |
| 2010/0305770 A1* | 12/2010 | Bhowmik | H02J 7/0014 700/295 |
| 2012/0112552 A1* | 5/2012 | Baarman | B60L 53/124 307/104 |
| 2012/0153729 A1 | 6/2012 | Song et al. | |
| 2013/0002201 A1 | 1/2013 | Bodkin et al. | |
| 2013/0175995 A1 | 7/2013 | Butzmann et al. | |
| 2016/0016479 A1 | 1/2016 | Khaligh et al. | |
| 2016/0043569 A1 | 2/2016 | Dally et al. | |
| 2016/0079766 A1* | 3/2016 | Jeong | H02J 50/80 307/104 |
| 2016/0204707 A1 | 7/2016 | Takahara et al. | |

FOREIGN PATENT DOCUMENTS

| | | |
|---|---|---|
| CN | 202827921 U | 3/2013 |
| DE | 112014004859 T5 | 7/2016 |
| EP | 1020973 A2 | 7/2000 |
| FR | 2977083 A1 | 12/2012 |
| JP | H07298505 A | 11/1995 |
| JP | 2008312395 A | 12/2008 |
| JP | 2011223750 A | 11/2011 |
| JP | 2015223073 A | 12/2015 |
| KR | 20130029400 A | 3/2013 |
| WO | 2010150139 A1 | 12/2010 |
| WO | 2011144509 A2 | 11/2011 |
| WO | 2015071045 A1 | 5/2015 |

* cited by examiner

DEVICE AND METHOD FOR SUPPLYING ENERGY TO A PLURALITY OF ENERGY STORAGE COMPONENTS AND/OR FOR PROVIDING ENERGY STORED WITHIN THE ENERGY STORAGE COMPONENTS

CROSS-REFERENCES TO RELATED APPLICATIONS

This application is a continuation of copending International Application No. PCT/EP2017/073686, filed Sep. 19, 2017, which is incorporated herein by reference in its entirety, and additionally claims priority from German Application No. DE 10 2016 218 160.2, filed Sep. 21, 2016, which is incorporated herein by reference in its entirety.

An embodiment in accordance with the present invention relates to a device for supplying energy to a plurality of energy storage components and for providing energy stored within the energy storage components. One embodiment in accordance with the present invention relates to an energy storage system comprising a device for supplying energy to a plurality of energy storage components and/or for providing energy stored within the energy storage components, to a first energy storage component and to a second energy storage component. One embodiment in accordance with the present invention relates to a method of supplying energy to a plurality of energy storage components and of providing energy stored within the energy storage components. One embodiment in accordance with the present invention relates to a device for supplying energy to a plurality of energy storage components and/or for providing energy stored within the energy storage components. One embodiment in accordance with the present invention relates to an energy storage system comprising a device for providing energy to a plurality of energy storage components and/or for providing energy stored within the energy storage components, to a first energy storage component and to a second energy storage component, the first and second energy storage components being electrically connected in series.

Further embodiments in accordance with the invention may include stationary energy storage components (e.g. stand-by battery power supplies) as well as battery systems in electrical vehicles. In addition, a further embodiment in accordance with the invention provides a bidirectional storage system comprising decoupled battery cell voltage. Moreover, embodiments in accordance with the invention include a storage system as well as storage electronics.

BACKGROUND OF THE INVENTION

So far there have existed various concepts for storing and providing electrical energy. For example, a rechargeable battery cell may be used for this purpose. However, it is useful in some cases to suitably connect several battery cells with one another so as to generate sufficient current or sufficient voltage, e.g., for a consumer.

WO 2015071045 describes an on-board power control circuit.

U.S. Pat. No. 6,172,505 describes a device for electronically testing or monitoring the state of a storage battery.

US 2005007797 describes a static inverter for batteries.

U.S. Pat. No. 5,994,793 describes a non-interruptible power system.

US 2010283433 describes an invention which generally relates to load compensation devices for batteries.

AT 514385 describes a square buck converter.

U.S. Pat. No. 6,100,663 describes a charger for inductively charging batteries.

US 2007029965 describes a battery charging circuit and a structure for compatibility with planar inductive charging platforms.

WO 11144509 describes inductive battery balancing (=battery charge equalization) with reduced circuit expenditure.

US 2005040711 describes a multiport-power converter wherein all ports are coupled by different windings of a high-frequency transformer.

U.S. Pat. No. 4,742,441 describes a high-frequency switching power converter.

U.S. Pat. No. 3,517,300 describes a power converter circuit comprising a frequency link.

US20030141843 describes a voltage balancing device for battery-operated devices.

US20050077879 describes an energy transfer device for energy source means and storage means that are connected in series.

US20050140335 describes a balancing device for a series of linked battery packs.

Therefore, there is a need for a flexible concept which facilitates supplying of energy to a plurality of energy storage components and provision of energy stored within the energy storage components.

SUMMARY

According to an embodiment, a device for supplying energy to a plurality of energy storage components and for providing energy stored within the energy storage components may have: a first energy storage terminal for connecting a first energy storage component; a second energy storage terminal for connecting a second energy storage component; a further terminal for supplying and/or providing energy; a first coupling mechanism configured to bidirectionally couple the first energy storage terminal to the shared magnetic flux; a second coupling mechanism configured to bidirectionally couple the second energy storage terminal to the shared magnetic flux; a further coupling mechanism configured to couple the further terminal to the shared magnetic flux; the device including galvanic separation of the first energy storage terminal and of the second energy storage terminal as well as of the further terminal; the device being configured such that coupling and removal of energy storage components to the shared magnetic flux together with an associated coupling mechanism is possible during operation, wherein said coupling involves mechanically guiding a coupling inductance, which is coupled to the first coupling mechanism, to that area wherein there is the shared magnetic flux, together with the first coupling mechanism and the first energy store connected to the first energy storage terminal, and wherein said removal involves mechanically guiding the coupling inductance, which is coupled to the first coupling mechanism, away from that area wherein there is the shared magnetic flux, together with the first coupling mechanism and the first energy store connected to the first energy storage terminal; the device being configured such that coupling or removal may be performed while an exchange of energy continues to take place between one or more energy storage components via the shared magnetic flux.

According to another embodiment, a device for supplying energy to a plurality of energy storage components and for providing energy stored within the energy storage components may have: a first energy storage terminal for connecting a first energy storage component; a second energy storage terminal for connecting a second energy storage component; a further terminal for supplying and/or providing energy; a first coupling mechanism configured to bidirectionally couple the first energy storage terminal to the shared magnetic flux; a second coupling mechanism configured to bidirectionally couple the second energy storage terminal to the shared magnetic flux; a further coupling mechanism configured to couple the further terminal to the shared magnetic flux; the device including galvanic separation of the first energy storage terminal and of the second energy storage terminal as well as of the further terminal; wherein the first or second coupling mechanism includes a sensor configured to sense a voltage or a current of an energy storage component; the device being configured to temporarily decouple one of the energy storage components during operation by means of the first coupling mechanism or the second coupling mechanism, and to measure, during a decoupled state of the first energy storage component or of the second energy storage component and during operation, an open-circuit voltage and/or an internal resistance of the energy storage component while an exchange of energy continues to exist between one or more other energy storage components and the alternating magnetic field, and to determine, on the basis of said measurement, a state of charge or a state of conservation of the decoupled energy storage component; or to measure, during decoupling of the first energy storage component or of the second energy storage component and during operation, an open-circuit voltage and/or an internal resistance of the energy storage component while an exchange of energy continues to exist between one or more other energy storage components and the alternating magnetic field, and to determine, on the basis of said measurement, a state of charge or a state of conservation of the decoupled energy storage component.

According to another embodiment, a device for supplying energy to a plurality of energy storage components and for providing energy stored within the energy storage components may have: a first energy storage terminal for connecting a first energy storage component; a second energy storage terminal for connecting a second energy storage component; a further terminal for supplying and/or providing energy; a shared magnetic flux guide; a first coupling mechanism configured to bidirectionally couple the first energy storage terminal to the shared magnetic flux guide; a second coupling mechanism configured to bidirectionally couple the second energy storage terminal to the shared magnetic flux guide; a further coupling mechanism configured to couple the further terminal to the shared magnetic flux guide; the device including galvanic separation of the first energy storage terminal and of the second energy storage terminal as well as of the further terminal; wherein the first coupling mechanism and/or the second coupling mechanism and/or the further coupling mechanism include(s) DC voltage circuit/AC voltage circuit coupling means configured to couple a respective DC voltage energy storage component to a respective coil which is arranged on the shared magnetic flux guide, and which has an alternating voltage induced therein or through which an alternating current flows during operation; the device including a control unit configured to provide control signals for the DC voltage circuit/AC voltage circuit coupling means, wherein the control unit is configured to specify, by means of the control signals, a direction of a flow of energy within the first coupling mechanism or within the second coupling mechanism from a respective energy storage component toward the magnetic flux guide, or vice versa, and to adapt the control signals to a frequency of an alternating magnetic field which has been generated or is to be generated within the magnetic flux guide; the device including a plurality of decentralized control units, each of which is configured to control an individual one of the coupling mechanisms or to control a group of coupling mechanisms; and the device including a central control unit configured to coordinate functions of the decentralized control units; the device including coupling of the control units by means of magnetic induction via the shared magnetic flux guide, for transmitting control signals between the central control unit and the decentralized control units.

An embodiment in accordance with the invention provides a device for supplying energy to a plurality of energy storage components and for providing energy stored within the energy storage components. The device comprises a first energy storage terminal (port) for connecting a first energy storage component and a second energy storage terminal for connecting a second energy storage component as well as a further terminal for supplying and/or providing energy. Moreover, the device comprises a shared magnetic flux guide. In addition, the device comprises a first coupling mechanism configured to bidirectionally couple the first energy storage terminal to the shared magnetic flux guide (or, generally, to a shared magnetic flux), a second coupling mechanism configured to bidirectionally couple the second energy storage terminal to the shared magnetic flux guide (or, generally, to the shared magnetic flux), as well as a further coupling mechanism configured to couple the further terminal to the shared magnetic flux guide (or, generally, to the shared magnetic flux). The device further comprises galvanic separation of the first energy storage terminal and of the second energy storage terminal as well as of the further terminal. A device configured in this manner facilitates flexible provision and supply of energy from and to the energy storage components.

This embodiment in accordance with the invention is based on the finding that electrical energy can be bidirectionally transmitted, combined or split up efficiently by means of an alternating magnetic field which advantageously forms within a magnetic flux guide, or concentrates within a magnetic flux guide (the shared magnetic flux guide not being mandatory, however), and that utilization of such a magnetic field-based coupling mechanism for coupling energy storage components to one another facilitates a large degree of freedom in individually specifying energy flux directions and energy flux quantities. In addition, the magnetic field-based coupling mechanism enables avoiding high voltages and/or large currents and therefore enables improvement of the reliability of an energy storage system. Furthermore, such an implementation is advantageous since by means of galvanic separation of energy storage components connected to the energy storage terminals, addition of currents or voltages, which may be hazardous to a user, may be avoided. Moreover, by means of said galvanic separation, improved modularity may be achieved since it will be easier to connect or remove energy storage components. In addition, for example, energy storage components having different states of aging may be connected to the energy storage terminals in a simplified manner. In summary, the embodiment described enables a device for supplying and providing energy with high flexibility.

Quite generally, the above-described shared magnetic flux guide may also be replaced by a shared magnetic flux, or any type of (one-piece or multi-piece) device which achieves a shared magnetic flux. For example, it is sufficient for the magnetic field (or the magnetic flux) to which the coupling mechanisms are coupled to be shared. The iron core of the coil(s) (or, generally, a magnetic flux guide) might be formed separately, however (so that, e.g., each coupling mechanism has a portion of the magnetic flux guide associated with it).

As far as reference is made herein to coupling to a shared magnetic flux guide, said coupling may also be replaced by coupling to a shared magnetic flux or to a shared magnetic field.

One aspect of the invention thus relates to a device for supplying energy to a plurality of energy storage components and for providing energy stored within the energy storage components, comprising a first energy storage terminal for connecting a first energy storage component, a second energy storage terminal for connecting a second energy storage component, a further terminal for supplying and/or providing energy, a first coupling mechanism configured to bidirectionally couple the first energy storage terminal to a shared magnetic flux, a second coupling mechanism configured to bidirectionally couple the second energy storage terminal to the shared magnetic flux, and a further coupling mechanism configured to couple the further terminal to the shared magnetic flux, the device comprising galvanic separation of the first energy storage terminal and of the second energy storage terminal as well as of the further terminal.

This device is based on the same considerations as the device described first and may be supplemented with the same features and functionalities as the device described first.

In a further advantageous embodiment, the device comprises a transformer, wherein the first coupling mechanism, the second coupling mechanism and the further coupling mechanism comprise coils arranged on the shared magnetic flux guide of the transformer. With such an embodiment, a desired voltage ratio may be advantageously produced at the terminals, for example by suitable dimensioning of the numbers of turns of the coils.

In such an advantageous embodiment, the device comprises further energy storage terminals as well as further coupling mechanisms for bidirectionally coupling further energy storage terminals. The further energy storage terminals are configured to connect further energy storage components, and the transformer is configured in the form of a multi-phase transformer. Such an embodiment is favorable in order to enable, e.g., coupling to a three-phase supply network which already exists or is to be generated.

In an advantageous embodiment, the first coupling mechanism and/or the second coupling mechanism and/or the further coupling mechanism and/or further coupling mechanisms comprise(s) DC voltage circuit/AC voltage circuit coupling means. Said DC voltage circuit/AC voltage circuit coupling means is configured to couple a respective DC voltage energy storage component to a respective coil which is arranged on the shared magnetic flux guide, and which has an alternating voltage induced therein or through which an alternating current flows during operation. A configuration of the device as described in the embodiment is advantageous in terms of generating, on the basis of energy stored within the energy storage component, an alternating voltage (e.g. by generating a contribution to the alternating magnetic field on the basis of the energy stored within the energy storage component), and/or to couple, e.g., a DC voltage energy storage component to an alternating magnetic field (for example by generating a direct current for storing energy within the energy storage component on the basis of an AC voltage generated by the alternating field).

In an advantageous embodiment, the device comprises a control unit configured to provide control signals for the DC voltage circuit/AC voltage circuit coupling means. The control unit is configured to specify, by means of the control signals, a direction of a flow of energy within the first coupling mechanism or within the second coupling mechanism from a respective energy storage component toward the magnetic flux guide, or vice versa. Furthermore, the control unit is configured to adapt the control signals to a frequency of an alternating magnetic field which has been generated or is to be generated within the magnetic flux guide. A device thus implemented is advantageous in terms of mutually adjusting, for example, energy storage components and sources and/or consumers which have different frequencies to one another. Here, e.g. a source or load having a fixed operating frequency determines a frequency of the alternating magnetic field. For example, the control unit may determine target frequency information, i.e. information regarding the frequency of the alternating magnetic field, and forward it to DC voltage circuit/AC voltage circuit coupling means. In accordance with the target frequency information obtained, a bidirectional coupling mechanism may couple, e.g., a DC voltage energy storage component to the alternating magnetic field of the magnetic flux guide by means of the DC voltage circuit/AC voltage circuit coupling means.

In an advantageous embodiment, the device is configured to implement battery management by means of the control unit. A device thus implemented is advantageous in terms of being able to perform active balancing, for example.

In an advantageous embodiment, the device comprises a plurality of decentralized control units, each of which is configured to control an individual one of the coupling mechanisms or to control a group of coupling mechanisms. In addition, the device comprises a central control unit configured to coordinate functions of the decentralized control units. Moreover, the decentralized control units are wirelessly coupled to the central control unit. A device corresponding to the embodiment is advantageous in terms of enabling, e.g., simple decoupling of energy storage components. Moreover, such a device offers advantages with regard to extensibility, for example, since newly added decentralized control units need not be connected to the central control unit via a cable link.

In an advantageous embodiment, the device comprises coupling of the control units by means of magnetic induction via the shared magnetic flux guide. By means of said coupling described, signals are transmitted between the central control unit and the decentralized control units. A device in accordance with the embodiment is advantageous, for example, for energetically favorable signal transmission since no additional transmission paths need to be established. Moreover, the embodiment described enables a more compact design of the device, for example.

In a further advantageous embodiment, the device comprises a control unit configured such that its energy requirement is covered by the power transmitted via the magnetic flux guide. Such an implementation of the device is advantageous since the control unit thus requires no additional energy supply.

In an advantageous embodiment, the device is configured such that connection and removal of energy storage components at the first energy storage terminal, at the second energy storage terminal or at a further energy storage terminal is possible during operation. Such an embodiment is rendered more favorable by galvanic separation of the energy storage components, i.e., for example, in that the energy storage components are not electrically connected in series. Such an implementation of the device is advantageous since connection or removal can take place while an exchange of energy can continue to take place between one or more energy storage components and an alternating magnetic field existing within the magnetic flux guide.

In an advantageous embodiment, the first or second coupling mechanism comprises a sensor configured to sense a voltage or a current of an energy storage component. Such a sensor may be advantageously used, for example, for sensing voltages or currents acting upon the energy storage component.

In an advantageous embodiment, the device is configured to temporarily decouple one of the energy storage components during operation, i.e. while an exchange of energy continues to exist between one or more other energy storage components and the alternating magnetic field, by means of the first coupling mechanism or the second coupling mechanism (e.g. by opening a semiconductor switch between the energy storage terminal and a coil arranged on the magnetic flux guide), no exchange of energy existing between the decoupled energy storage component and the alternating magnetic field. In addition, the device is configured to determine a state of charge or a state of conservation and/or a state of aging of the decoupled energy storage component, e.g. during a decoupled state of the first energy storage component or of the second energy storage component and during operation, i.e. while an exchange of energy continues to exist between one or more other energy storage components and the alternating magnetic field, by measuring, e.g., the no-load voltage or the internal resistance of an energy storage component, which energy storage component need not be removed or disconnected from the device, for example.

In an advantageous embodiment, the device is configured to change a state of loading of an energy storage component by means of the first coupling mechanism or the second coupling mechanism during operation, while an exchange of energy continues to exist between one or more other energy storage components and the alternating magnetic field, and while a predefined power is output to a load on the part of the device in accordance with a load profile, so as to characterize the energy storage component.

For determining the internal resistance (of the energy storage component) it might be useful (but need not be) to supply a short defined load on the battery (or, generally, on the energy storage component), in addition to measuring the no-load voltage (which measurement may typically be effected when the energy storage component is decoupled).

In accordance with one aspect, for example, a voltage difference (excess voltage) is calculated from the difference between the open-circuit voltage and the voltage present in the loaded state (when there is a defined current), which voltage difference will then, according to Ohm's law, result in an internal resistance together with the current.

Given the design in accordance with the present invention (with individual energy storage components which are coupled, in a galvanically separated manner, to a shared magnetic flux and/or a shared magnetic flux guide via respective coupling mechanisms), it is possible to reproduce various loads (such as diagnosis profiles/measurements) for the individual components (e.g., generally, energy storage components) while providing a superordinate load profile (e.g., for driving an electric car).

Simple disconnection (of an energy storage component) (for example during operation) may also be used for measuring the internal resistance if the current flowing prior to disconnection was known. Thus, this will yield the voltage and the current while a load is applied, and the voltage during an idle state (and said quantities may be used for further calculations, for example).

However, the current loading before (e.g. prior to disconnection) may not be defined. Accordingly, the device may optionally be supplemented, for example, in that with the design given, decoupling and/or a defined load (current pulse), which is independent of the provision of residual energy and allows calculation of the internal resistance, is possible. In addition to the state of charge, the internal resistance may thus also be used for drawing a conclusion as to the aging and the performance of the battery.

Generally, the device described herein may thus (optionally) be designed such that the possibility of a defined load (e.g. current pulse during regular operation) for measuring the internal resistance is provided (which enables characterizing of the energy storage component).

In an advantageous embodiment, the device comprises a control unit configured to enable, irrespective of a polarity with which an energy storage component is coupled to an energy storage terminal, charging of the energy storage component or coupling of energy from the energy storage component to a magnetic field through the magnetic flux guide. A device in accordance with the described embodiment is advantageous in terms of preventing, e.g., a hazard to the user's health which may be caused by connecting energy storage components which are not properly polarized.

In an advantageous embodiment, the device is configured to adjust a state of charge of the first energy storage component connected to the first energy storage terminal and a state of charge of the second energy storage component connected to the second energy storage terminal. An embodiment thus implemented may be advantageously used, for example, for employing energy storage components comprising different charge contents.

In an advantageous embodiment, the device is configured to adjust the states of charge of an energy storage component connected to the first energy storage terminal or of an energy storage component connected to the second energy storage terminal by selectively charging or discharging said energy storage components. Selective charging or discharging may be advantageously used for providing, e.g., efficient utilization of the charge provided within the energy storage components.

In an advantageous embodiment, the device is configured to adjust states of charge of the energy storage components by using different speeds of discharging energy storage components connected to different energy storage terminals. The device described in the embodiment may be advantageously used, for example, for efficiently exploiting charge contents of energy storage components since efficient charging or discharging of the energy storage components is possible, for example, when the state of charge has been adjusted.

In an advantageous embodiment the device is configured to continue to enable provision of energy following discharge of an energy storage component up to a final discharge limit, e.g. a limit up to which an energy storage component may be discharged, by using one or more other energy storage components. Here, no further energy is withdrawn from the energy storage component which has reached the final discharge limit, since withdrawing further energy may cause disadvantageous depth discharge, for example. In other words, irreversible damage to the energy storage component may be prevented by preventing further discharge, for example. What is advantageous here is that continued operation may be ensured by removing energy from other energy storage components. Such operation, e.g., provision of energy, may be performed with less overall power over a certain period of time or may be performed with the same overall power over a shorter period of time as compared to a state wherein all energy storage components are available for discharge.

In an advantageous embodiment, the first coupling mechanism and/or the second coupling mechanism comprises(s) a temperature sensor to sense the temperatures of the connected energy storage components. Such temperature detection may be advantageously used for implementing battery management.

In an advantageous embodiment, the device is configured to ensure a reliable operating state of the energy storage components by means of a temperature sensed by a temperature sensor. For example, temperature information thus obtained may be advantageously used for protecting an energy storage component from overheating.

In an advantageous embodiment, the device comprises further inductive coupling mechanisms so as to couple further sources or consumers. A device implemented in this manner is advantageous in terms of ensuring, e.g., scalability of the device.

An advantageous embodiment describes an energy storage system. The energy storage system includes a device for supplying energy to a plurality of energy storage components and/or for providing energy stored within the energy storage components, as described in the above embodiments. In addition, the energy storage system includes a first energy storage component as well as a second energy storage component, the energy storage components being implemented by rechargeable batteries. An embodiment implemented in this manner is advantageously suited, for example, for low-cost implementation of the energy storage system, for example by using commercially available batteries. In addition, the system described may be used for avoiding large currents and/or high voltages, in particular on the part of the energy storage components.

In an advantageous embodiment, the energy storage system is configured such that a first energy storage component connected to the first energy storage terminal differs from a second energy storage component connected to the second energy storage terminal. The first and second energy storage components may differ, e.g., in terms of their respective capacities, terminal voltages, numbers of cells, states of conservation and/or states of aging, or technology of the battery. A system thus configured may be advantageous, for example, in terms of saving costs, for example by using heterogeneous energy storage components which are already present, as a result of which purchase of new components can be avoided. In addition, this system may be configured in a flexible manner with regard to the energy storage components employed; for example, a desired target voltage may be generated with a different number of energy storage components of different capacities. In conventional systems, the target voltage, which in most cases is high (e.g. 400 volt for an electric car) may be produced by connecting the low cell voltages (approx. 4 volt) in series. However, as a result, the number of cells is also defined, and said number of cells can then be multiplied only by means of a parallel connection, i.e., times 2, times 3, etc. In accordance with the embodiment described, however, times 2.5 is also possible, however. I.e., for example, instead of 100 serial and 2 parallel cells, 10 energy storage components are coupled together with 25 serial cells in each case. Therefore, one can obtain a voltage by using different numbers of cells, and said cells may additionally also have different capacities.

In an advantageous embodiment, the system comprises several galvanically separated energy storage components which are magnetically coupled via the magnetic flux guide. A system configured in this manner is advantageous, for example, since as a result, one can prevent large direct currents or high direct voltages from arising which might be dangerous to a user.

An advantageous embodiment in accordance with the invention provides a method of supplying energy to a plurality of energy storage components and of providing energy stored within the energy storage components. Here, a first energy storage component and a second energy storage component are coupled to a shared magnetic flux guide. Moreover, the method includes at least temporary utilization of energy of the first energy storage component for generating, or for reinforcing or contributing to, an alternating magnetic field within the shared magnetic flux guide, and for providing energy to a consumer coupled to the magnetic flux guide. In addition, the method includes at least temporarily supplying energy to the first energy storage component on the basis of an alternating magnetic field which is present within the magnetic flux guide and is generated by an energy source coupled to the magnetic flux guide. Furthermore, the method includes at least temporary utilization of energy of the second energy storage component for generating, or for reinforcing or contributing to, an alternating magnetic field within the shared magnetic flux guide. Also, the method includes at least temporarily supplying energy to the second energy storage component based on an alternating magnetic field present within the magnetic flux guide. The method described in the embodiment may be advantageously used for charging or discharging energy storage components in a flexible manner. The method may be extended by all of the features and functionalities which are described herein with reference to the inventive devices.

An embodiment of the invention provides a device for supplying energy to a plurality of energy storage components and/or for providing energy stored within the energy storage components. The device includes a first energy storage terminal for connecting a first energy storage component, a second energy storage terminal for connecting a second energy storage component, a further terminal for supplying and/or providing energy, a shared magnetic flux guide, a first coupling mechanism configured to couple the first energy storage terminal to the shared magnetic flux guide, a second coupling mechanism configured to couple the second energy storage terminal to the shared magnetic flux guide, and a further coupling mechanism configured to couple the further terminal to the shared magnetic flux guide. In addition, the first energy storage terminal and the second energy storage terminal are configured to achieve electrical connection in series of the first energy storage component and of the second energy storage component. Moreover, the device is configured to balance the states of charge of the first and/or second energy storage components by selectively charging or discharging an energy storage component connected to the first energy storage terminal or of an energy storage component connected to the second energy storage terminal. Such a device is advantageous in terms of supplying charge to or withdrawing charge from the energy storage components, which may advantageously be effected, for example, by means of the electric connection in series or by means of the coupling via the shared magnetic flux guide. For example, the series connection may serve to supply an electrical consumer with current while energy is supplied to the energy storage components via the magnetic coupling. Generally speaking, the device may achieve, for example, a first functionality (for example charging of the energy storage components or supplying energy to a first consumer) while using the series connection. A second functionality of the device (e.g. charge balancing, charging from a different energy source than in the first functionality, or providing energy for a different consumer than in the first functionality) may be achieved, for example, via magnetic coupling. The first and second functionalities may be used one after the other or at the same time, for example. In addition, selective charging or discharging may be advantageously used for enabling, e.g., efficient utilization of the charge provided within the energy storage components, the increased efficiency of utilization being based, for example, on the fact that, e.g., charging of an energy storage component is unnecessary for achieving balancing. The energy flow that is useful for charging might result in additional losses, for example during its transport or withdrawal or re-storage. Since charging of energy storage components may accelerate aging, it is advantageous to refrain from unnecessarily charging energy storage components which are already weak and/or exhibit a state of advanced aging, and to enable adaptation of charge to other energy storage components by means of selective discharge.

In an advantageous embodiment, the device is configured to charge the energy storage components, which are electrically connected in series, together while using a shared charge current, so that the shared charging current flows through the series connection, and so that the energy storage components connected in series effectively act, e.g., from the perspective of a charging current source, as one energy storage component, the terminal voltage of which equals a sum of individual terminal voltages of the energy storage components connected in series. Such a device is advantageous in terms of providing a load with energy via the shared magnetic flux guide, for example, it being possible for the energy storage components to be supplied with energy via the electric series connection, for example.

In an advantageous embodiment, the device is configured to connect a shared load via the energy storage components connected in series, so that a shared load current flows through the series connection, and that the energy storage components connected in series effectively act, e.g., for the load and/or from the perspective of the load, as one energy storage component, the terminal voltage of which equals a sum of individual terminal voltages of the energy storage components connected in series. A device thus implemented is advantageous in terms of charging the energy storage components via the magnetic flux guide; for example, energy from the energy storage components is simultaneously used for supplying a load located within the series connection.

In an advantageous embodiment, the device is configured to enable individual charging of the first energy storage component connected to the first energy storage terminal and/or to enable individual charging of the second energy storage component connected to the second energy storage terminal by individually withdrawing energy from the alternating magnetic field of the magnetic flux guide via the first coupling mechanism and/or the second coupling mechanism. A device thus implemented may be advantageous in terms of taking into account, e.g., different states of charge or different capacities of energy storage components.

An advantageous embodiment of the invention describes an energy storage system. The energy storage system includes a device for supplying energy to a plurality of energy storage components and/or for providing energy stored within the energy storage components as described above. In addition, the system includes a first energy storage component and a second energy storage component, the first energy storage component and the second energy storage component being electrically connected in series. A system configured in this manner may be advantageously used, for example, for simultaneously providing energy from and supplying energy to the energy storage components (e.g., batteries) of the energy storage system.

BRIEF DESCRIPTION OF THE DRAWINGS

Embodiments of the present invention will be detailed subsequently referring to the appended drawings, in which.

DETAILED DESCRIPTION OF THE INVENTION

1. Embodiment of FIG. 1

Figure 1:
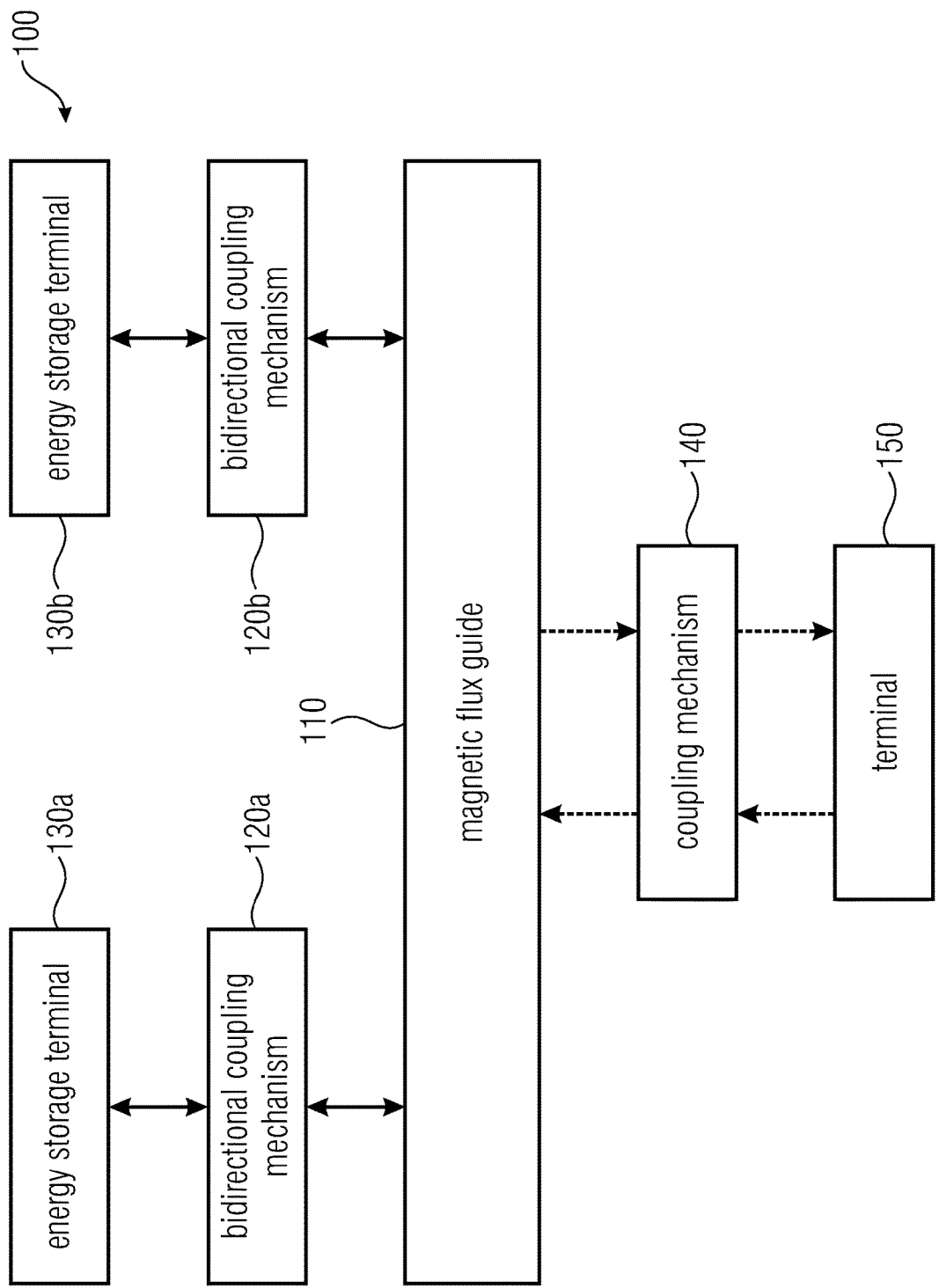
FIGS. 1 and 2 show schematic representations of devices in accordance with an embodiment of the present invention.

FIG. 1 shows a schematic representation of a device in accordance with an embodiment of the present invention.

The device 100 includes a magnetic flux guide 110, a first bidirectional coupling mechanism 120a as well as a second bidirectional coupling mechanism 120b, a first energy storage terminal 130a as well as a second energy storage terminal 130b. In addition, the device 100 includes a coupling mechanism 140 and a further terminal 150.

The energy storage terminals 130a-b of the device 100 are configured to enable connection of energy storage components. The first bidirectional coupling mechanism 120a and the second bidirectional coupling mechanism 120b are configured to couple a first energy storage component or a second energy storage component, which are connected to the first energy storage terminal 130a and the second energy storage terminal 130b, respectively, to the magnetic flux guide 110. Here, energy may be coupled into the magnetic flux guide or decoupled from the magnetic flux guide 110 via the first bidirectional coupling mechanism 120a or the second bidirectional coupling mechanism 120b. The energy coupled out of the magnetic flux guide 110 may be provided to a first or second energy storage component, e.g. via the energy storage terminals 130a-b.

Incidentally, the energy coupled into the magnetic flux guide 110 may be withdrawn from a first energy storage component, which is linked to the magnetic flux guide 110 via the first energy storage terminal 130a and the first bidirectional coupling mechanism 120a. In addition, for example, the magnetic energy coupled into the magnetic flux guide 110 may be withdrawn from a second energy storage component, which is linked to the magnetic flux guide 110 via the second energy storage terminal 130b and the second bidirectional coupling mechanism 120b. Moreover, the energy coupled into the magnetic flux guide 110 may be withdrawn from a plurality of energy storage components, which are coupled to the magnetic flux guide 110 via energy storage terminals, e.g., the energy storage terminals 130a and 130b, and bidirectional coupling mechanisms, e.g., the coupling mechanisms 120a and 120b.

In addition, a further coupling mechanism 140 may be used, for example, for providing energy at the terminal 150. Furthermore, the further coupling mechanism 140 may serve, e.g., to connect a source to the magnetic flux guide via the terminal 150, so that energy may be coupled into the magnetic flux guide, which energy may be provided, for example, to an energy storage component which is connected to one of the energy storage terminals 130a-b.

In summary, it is therefore to be stated that by means of an energy transfer via a magnetic flux guide 110 having an alternating magnetic formed therein, a consumer at the terminal 150 may be supplied. To this end, an alternating magnetic field may be built up by means of energy which is withdrawn from energy storage components connected to the magnetic flux guide 110 via the energy storage terminals 130a-b and the bidirectional coupling mechanisms 120a-b. Moreover, energy from the alternating magnetic field of the magnetic flux guide 110 may be supplied to a first energy storage component or to a second energy storage component connected to the first energy storage terminal 130a or to the second energy storage terminal 130b, wherein, e.g., a source feeds, at a further terminal 150, the alternating magnetic field within the magnetic flux guide 110, i.e., contributes to building the alternating magnetic field. In addition, the energy storage terminals 130a and 130b are configured to galvanically separate energy storage components connected to the terminals.

Optionally, the device 100 may be supplemented by one or all of the structural features and/or functionalities to be described below.

2. Second Embodiment of FIG. 2

Figure 2:
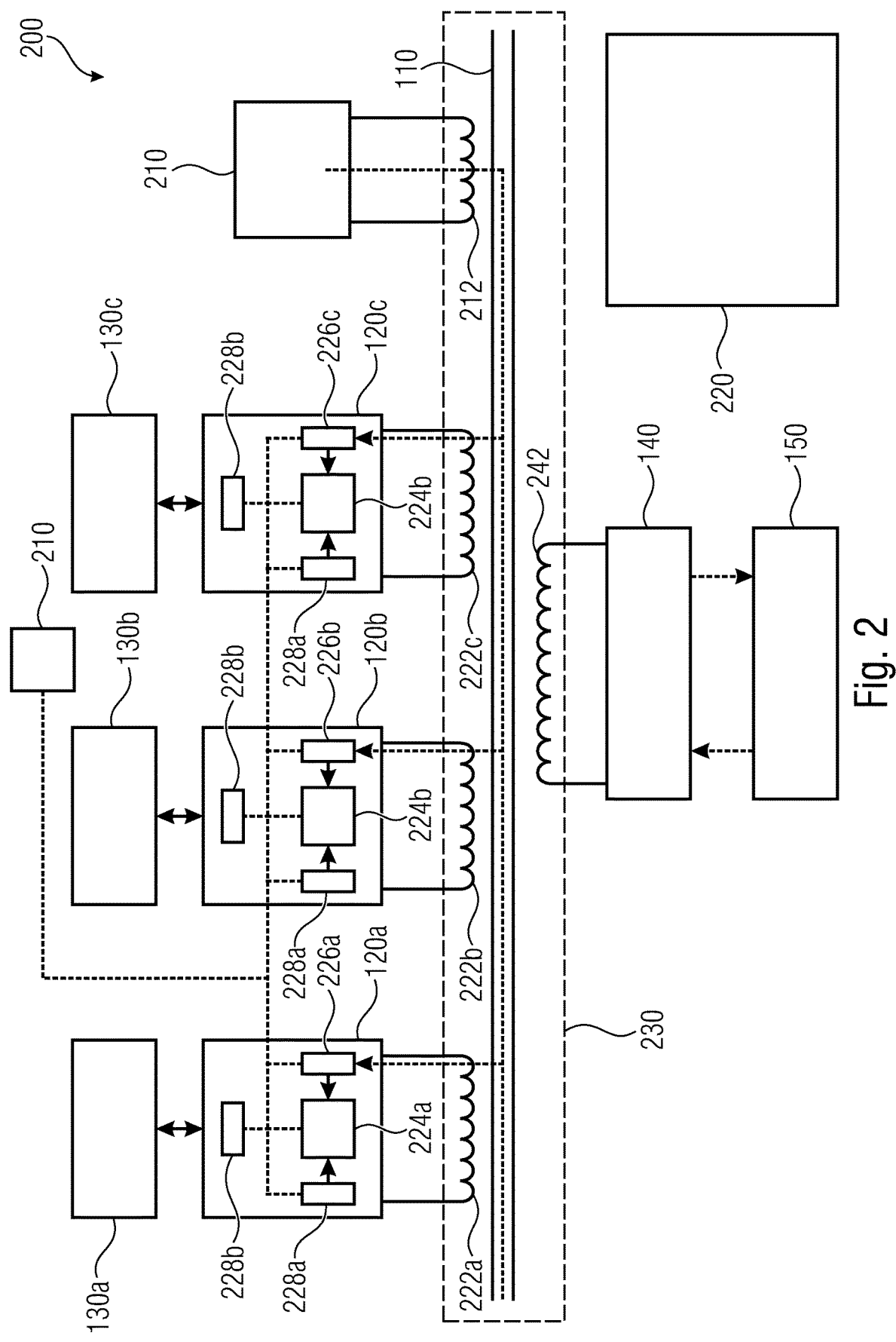

FIG. 2 shows a schematic representation of a device in accordance with an embodiment of the present invention.

The device 200 includes a magnetic flux guide 110, a first bidirectional coupling mechanism 120a, a second bidirectional coupling mechanism 120b, and a further bidirectional coupling mechanism 120c as well as a first energy storage terminal 130a, a second energy storage terminal 130b, and a further energy storage terminal 130c. In addition, the device 200 includes a further coupling mechanism 140 as well as a further terminal 150. Furthermore, the device 200 includes a central control unit 210 inductively coupled to the bidirectional coupling mechanisms 120a-c, e.g., in a wireless manner or via the magnetic flux guide. On top of that, the device 200 includes a further optional inductive coupling mechanism 220. The bidirectional coupling mechanisms 120a-c comprise respective inductive coils 220a-c, whereby coupling of the alternating magnetic field within the magnetic flux guide 110 is made possible. Additionally, the bidirectional coupling mechanisms 120a-c comprise respective DC voltage circuit/AC voltage circuit coupling means 224a-c, whereby, e.g., DC voltage energy storage components may be coupled to the alternating magnetic field within the magnetic flux guide 110. Moreover, the bidirectional coupling mechanisms 120 may each comprise a decentralized control unit 226a-c, each of which is connected to the central control unit 210. Furthermore, the bidirectional coupling mechanisms 120a-c may comprise a temperature sensor 228a or a voltage or current sensor 228b. Additionally, the central control unit may be equipped with a coil 212 in the event of inductive coupling via the magnetic flux guide 110. In addition, the further coupling mechanism 140 comprises a coil 242, whereby the further terminal 150 may be coupled to the magnetic flux guide 110. In addition, the arrangement of the coils 222a-c, 212 and 242 on the magnetic flux guide 110 forms a transformer 230.

The bidirectional coupling mechanisms 120a-c may ensure reliable operation of the energy storage components, connected to the energy storage terminals 130a-c, e.g., by means of the temperature sensors 228a so as to introduce suitable countermeasures in the event of overheating, for example, such as switching off or cooling the energy storage components. Additionally, the bidirectional coupling mechanisms 120a-c may determine, by means of the current or voltage sensors 228b, e.g., a state of charge or a state of conservation of a respective energy storage component connected to the energy storage terminals 130a-c, so as to take suitable measures, for example, if need be, for efficiently operating the energy storage components, wherein, for example, individually adjustable energy withdrawal or energy supply from or to the respective energy storage component is implemented. Such determining of the voltage or current may be performed, for example, by temporarily decoupling the energy storage component while continuing, e.g., to provide or supply energy at the terminal 150, so as to determine a state of charge or a state of aging.

In summary, one may thus state that the device 200 enables, e.g., flexible charging and discharging of energy storage components which may be connected to the energy storage terminals 130a-c. According to their state of charge, they may individually have energy withdrawn from or supplied to them. Said individual withdrawal of or provision with energy is enabled, in particular, by the bidirectional coupling mechanisms 120a-c. The coupling mechanisms 120a-c may individually couple energy into or out of the alternating magnetic field of the magnetic flux guide 110. For example by providing further bidirectional coupling mechanisms as well as energy storage terminals, the device 200 may be individually extended. Furthermore, the device 200 may supply energy to or withdraw energy from the alternating magnetic field of the magnetic flux guide 110, for example by means of the further terminal 150 and of the further coupling mechanism 140. For example, the further terminal 150 may have a source connected to it which supplies energy to the alternating magnetic field within the magnetic flux guide 110 via the further coupling mechanism 140. Also, the further terminal 150 may have a load connected to it, for example, which is supplied by energy withdrawn from the alternating magnetic field of the magnetic flux guide 110 via the further coupling mechanism.

3. Energy Storage System of FIG. 3

Figure 3:
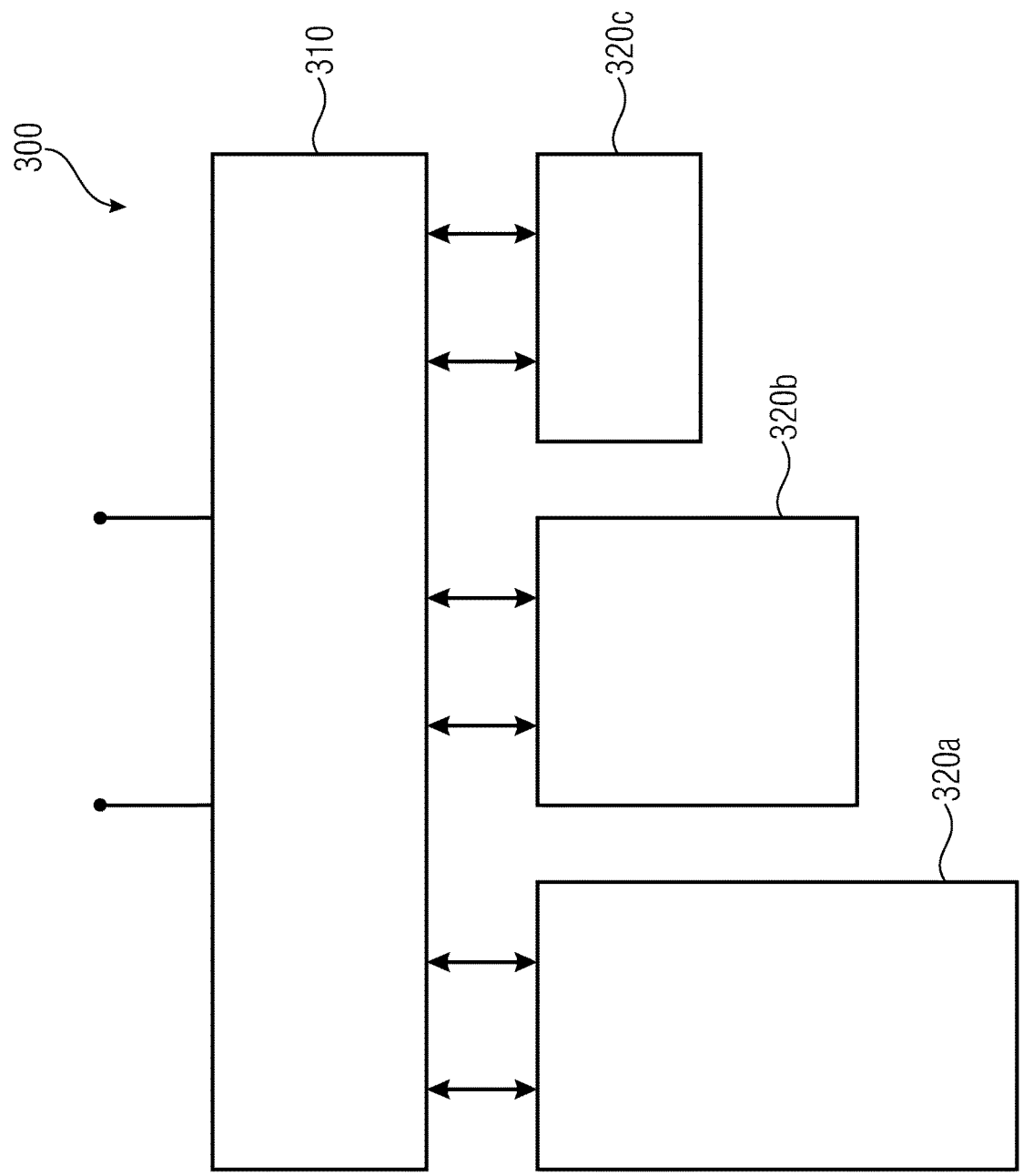
FIG. 3 shows a schematic representation of an energy storage system in accordance with an embodiment of the present invention.

FIG. 3 shows a schematic representation of an energy storage system 300 in accordance with an embodiment of the invention.

The energy storage system 300 comprises a device 310 for supplying energy to a plurality of energy storage components and for providing energy stored within the energy storage components, as well as a first energy storage component 320a, a second energy storage component 320b and a further energy storage component 320c. The energy storage components 320a-c may include electrical energy stores, e.g., rechargeable batteries or accumulators. In addition, the energy storage components 320a-c may individually differ from one another; for example, a first energy storage component 320a may include a larger number of individual cells or battery than a second energy storage component 320b. Furthermore, the individual energy storage components 320a-c may consist of one battery each, for example, which are individually different, e.g., in terms of their respective capacity, state of conservation, state of aging or underlying technology. Moreover, an energy storage component 320a-c may include a plurality of batteries, e.g., in the form of series or parallel connection of individual cells or batteries.

In summary, one may thus state that an energy storage system 300 may utilize already existing energy storage components at low cost and in a flexible manner, so that purchase of new components is not required, for example, since existing energy stores may be used, for example.

4. Embodiments of FIG. 4

Figure 4:
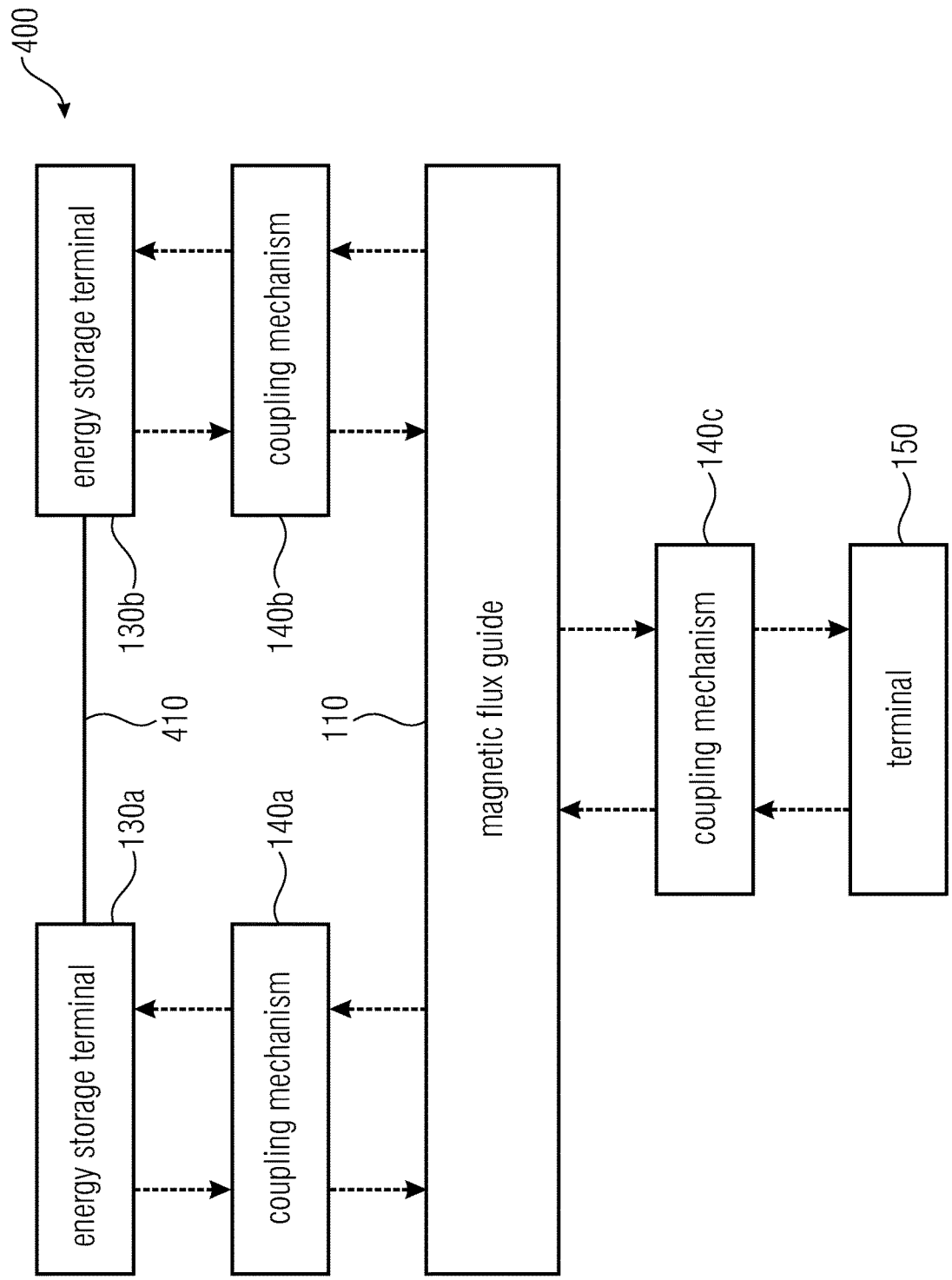
FIG. 4 shows a schematic representation of a device in accordance with an embodiment of the present invention.

FIG. 4 shows a schematic representation of a device 400 in accordance with an embodiment of the present invention.

The device 400 includes a magnetic flux guide 110, a first coupling mechanism 140a, a second coupling mechanism 140b, a further coupling mechanism 140c as well as a first energy storage terminal 130a, a second energy storage terminal 130b, and a further terminal 150. In addition, the device 400 comprises a serial link 410 of the first energy storage terminal 130a and the second energy storage terminal 130b.

The first coupling mechanism 140a or the second coupling mechanism 140b or the further coupling mechanism 140c may be configured to withdraw energy from or supply energy to the alternating magnetic field which may form within the magnetic flux guide 110. Thus, flexible charging or discharging of energy storage components connected to the energy storage terminals 130a and 130b may be enabled. The further terminal 150 may serve, for example, to connect a source which may be used for supplying energy to energy storage components connected to the energy storage terminals 130a-b via the magnetic flux guide 110. In addition, a load may also be connected, for example, to the further terminal 150, which load may have energy supplied to it, via the magnetic flux guide 110, from the energy storage components connected to the first energy storage terminal 130a or to the second energy storage terminal 130b. By means of the serial link 410, energy storage components connected to the energy storage terminals 130a and 130b may be used in series connection. For example, a shared charging current may be impressed into the energy storage components connected to the energy storage terminals 130a and 130b. Alternatively, a shared load current may flow through the energy storage components connected to the energy storage terminals 130a and 130b.

In summary, it is therefore to be stated that the device 400 described here is suited to individually supply energy storage components connected to the first energy storage terminal 130a or to the second energy storage terminal 130b with energy, e.g., with energy from a source connected to the further terminal 150. Moreover, a load connected to the further terminal 150 may be supplied with energy from energy storage components which is withdrawn at the first energy storage terminal 130a or the second energy storage terminal 130b. Here, mutual charging may be avoided by selectively discharging energy storage components connected to the energy storage terminals 130a and 130b, so as to enable adjusting or balancing of the energy storage components. In this manner, losses occurring during recharging, for example, may be avoided, or weak energy storage components may be spared since a charging process may cause aging and, thus, weakening of an energy storage component.

5. Embodiments of FIG. 5

Figure 5:
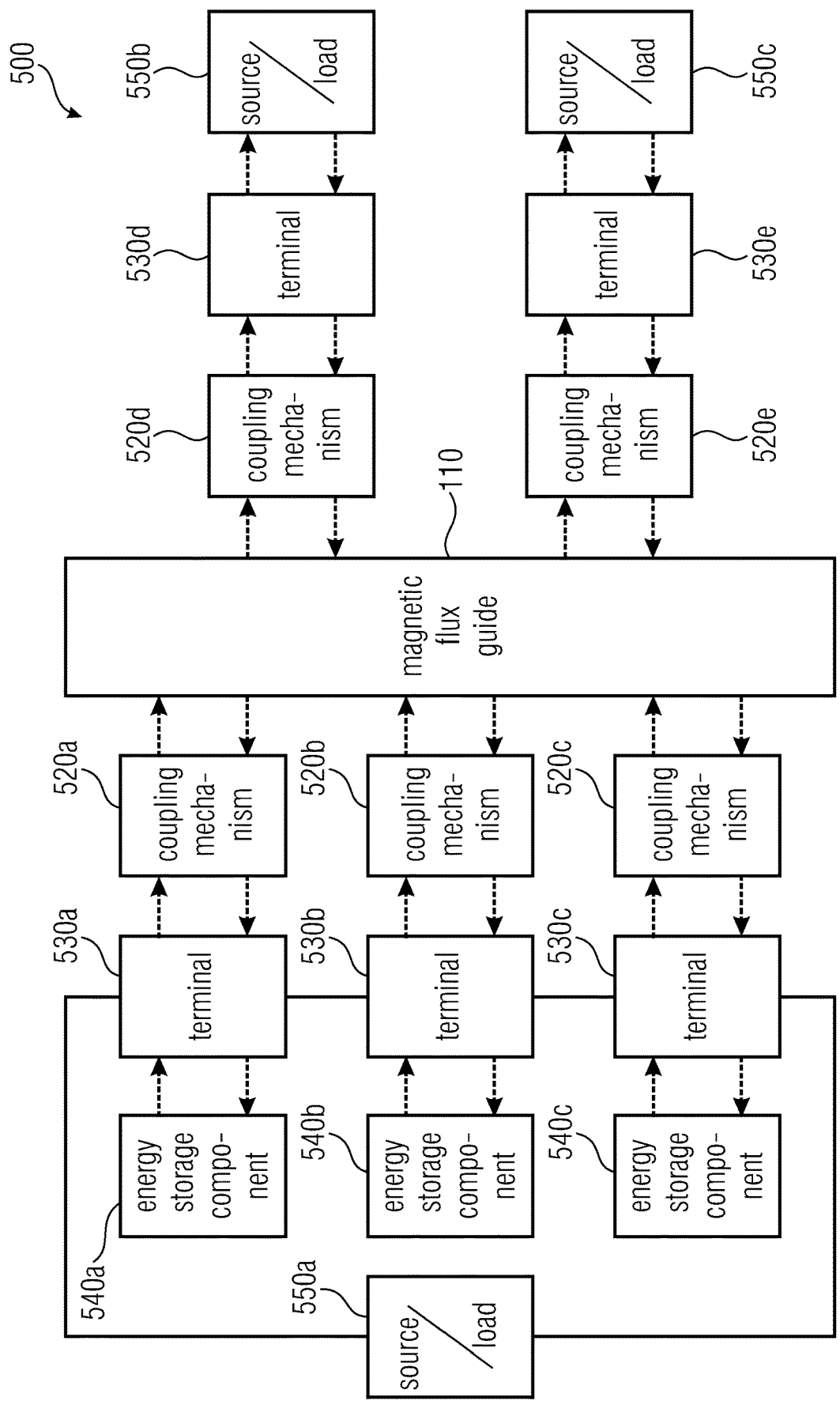
FIGS. 5 and 6a-c show schematic representations of energy storage systems in accordance with an embodiment of the present invention.

FIG. 5 shows a schematic representation of an energy storage system 500 in accordance with an embodiment with the present invention.

The energy storage system 500 includes a magnetic flux guide 110, several coupling mechanisms 520a-e, a first energy storage terminal 530a, a second energy storage terminal 530b, a further energy storage terminal 530c as well as two further terminals 530d and 530e. The energy storage terminals 530a-c are configured such that series connection of energy storage components connected to the energy storage terminals 530a-c is enabled.

The elements of the energy storage system 500 which have been described so far largely correspond to the elements of the device 400 described in FIG. 4. The energy storage system 500 further includes a first energy storage component 540a, a second energy storage component 540b as well as a further energy storage component 540c, which are connected to the energy storage terminals 530a-c and are thereby connected in series. The series connection may enable, e.g., utilization of a shared source 550a, which is electrically connected in series to the energy storage components, for supplying energy to the energy storage components. In addition, the series connection may serve to supply a shared load connected in series to the energy storage components with a shared load current, said load current being fed by withdrawing energy from the energy storage components. The source or load 550a may be an electrical drive, for example, which sometimes exhibits the characteristic of an electrical consumer or of an electrical generator. In addition, for example, further sources or loads 550b and 550c may be linked via the shared magnetic flux guide 110. To this end, further sources, e.g., 550b and 550c, may serve to supply energy to the energy storage components. In addition, further loads, e.g. 550b and 550c, may be supplied with energy withdrawn from the energy storage components.

6. Embodiments of FIGS. 6a-c

Figure 6A:
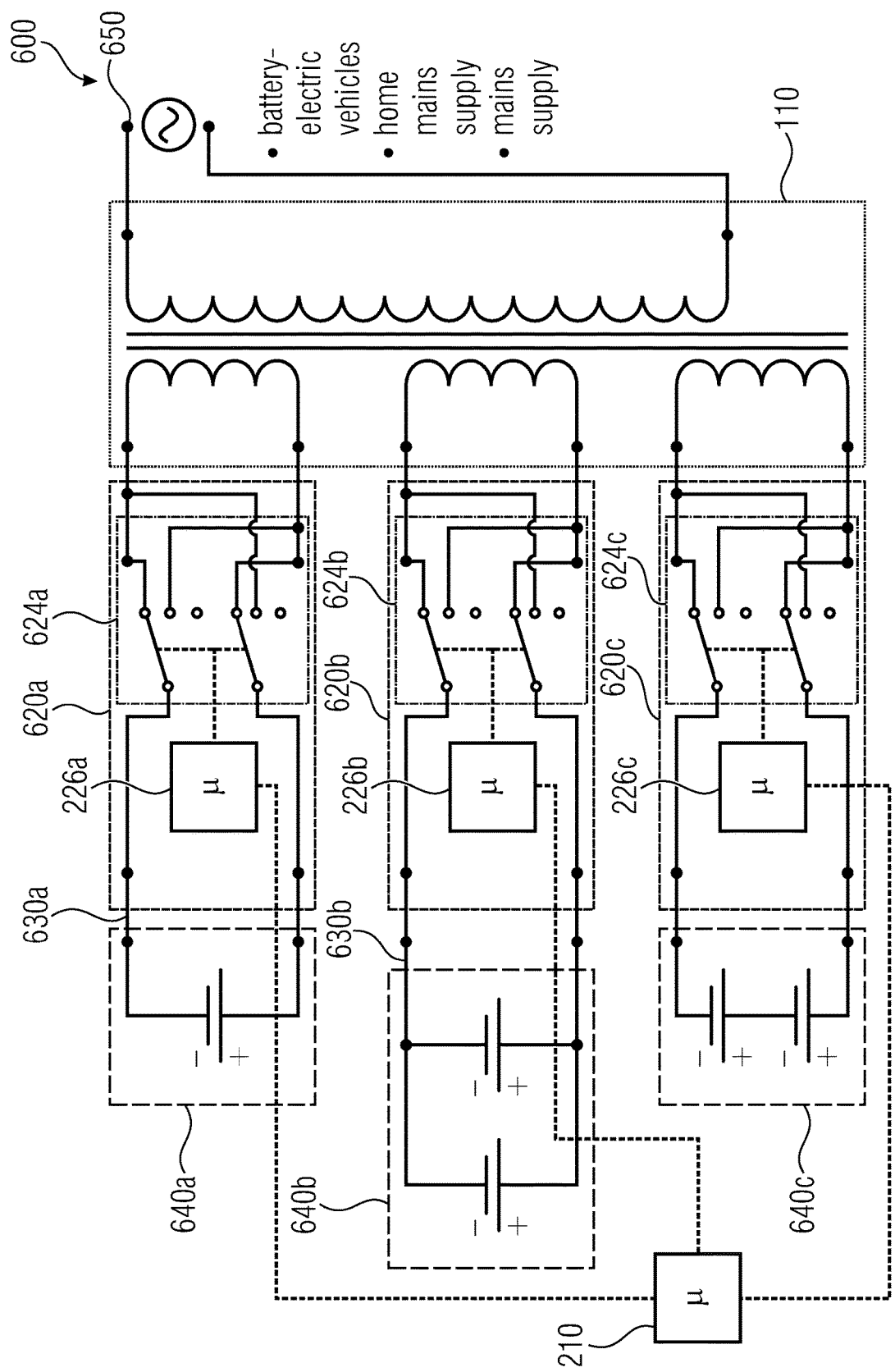
Figure 6B:
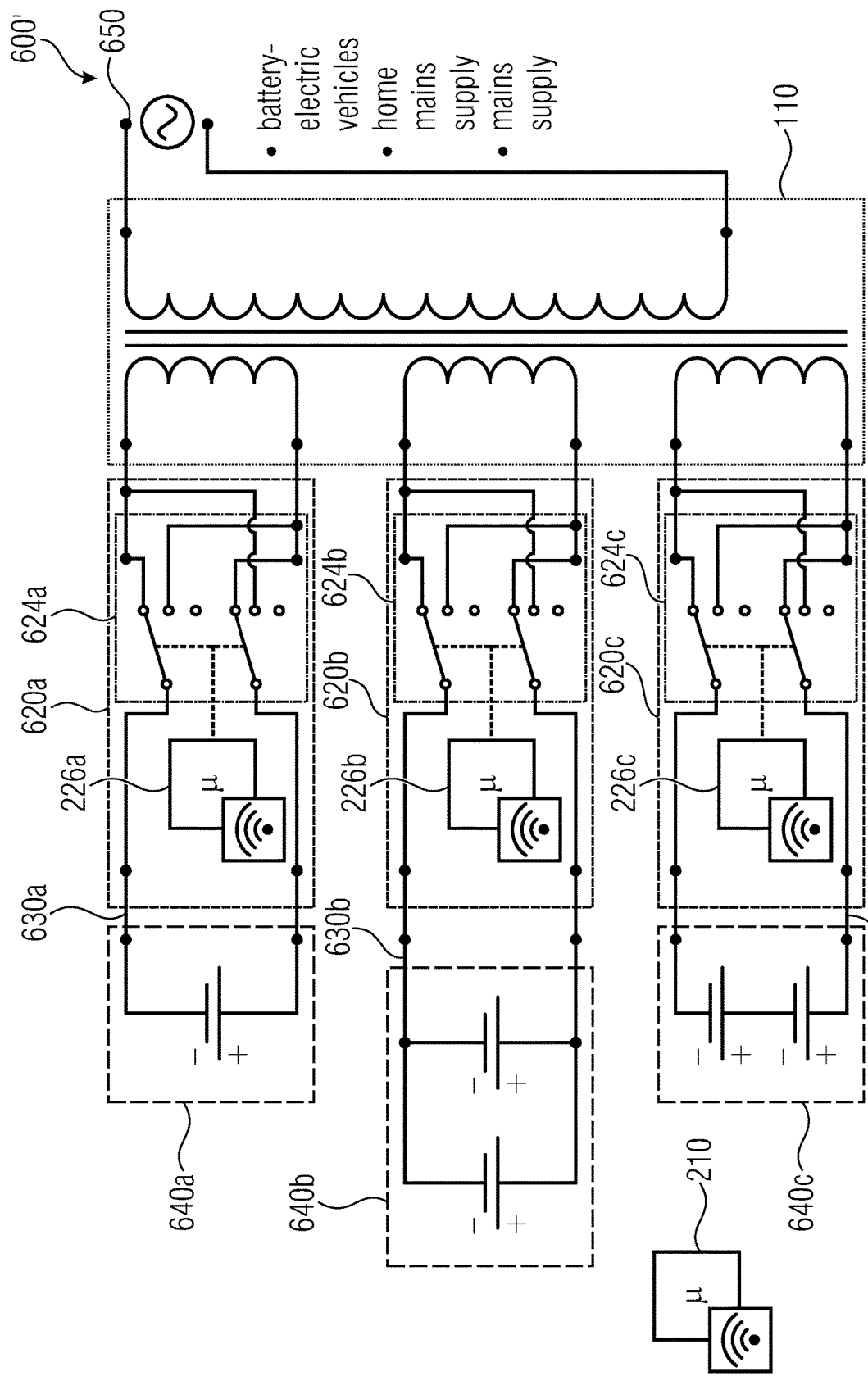
Figure 6C:
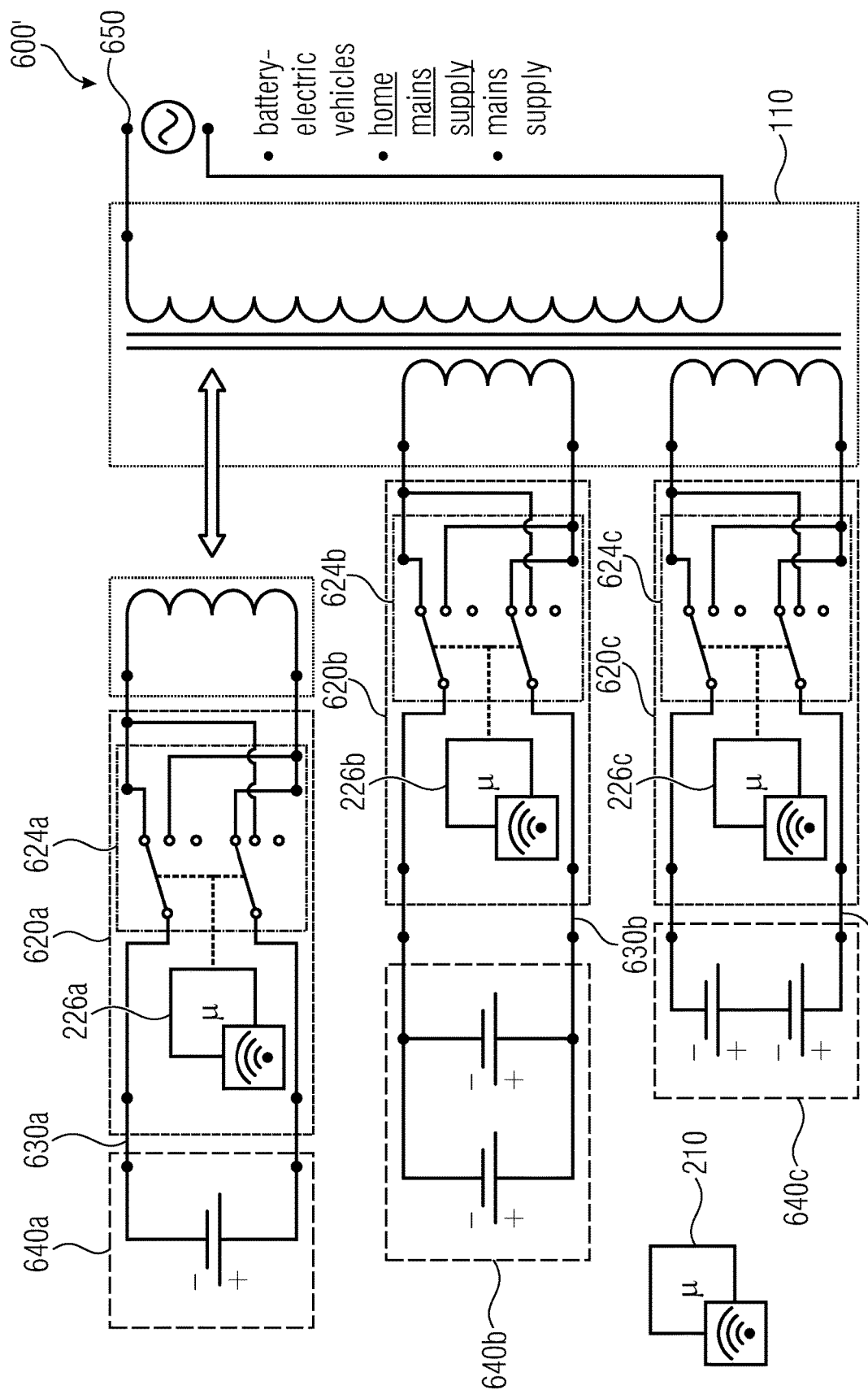

FIGS. 6a-c show schematic representations of a device in accordance with an embodiment of the present invention.

The device 600 comprises three energy storage components 640a-c, the energy storage component 640 including a single battery cell, the energy storage component 640b including two battery cells in parallel connection, and the energy storage component 640c including two battery cells in series connection. The energy storage components 640a-c are connected to respective bidirectional coupling mechanisms 620a-c via energy storage terminals 630a-c. It is by means of coils via a shared magnetic flux guide 110 that the bidirectional coupling mechanisms 620a-c link the energy storage components 640a-c to one another as well as to a further terminal 650 suitable for connecting a source or a load. The bidirectional coupling mechanisms 620a-c each comprise DC voltage circuit/AC voltage circuit coupling means 624a-c. Moreover, the bidirectional coupling mechanisms 620a-c each have a decentralized control unit 226a-c. In addition, the device 600 comprises a further control unit 210. FIG. 6 describes an embodiment of the device 600 wherein the central control unit 210 communicates with the decentralized control units 226a-c, e.g. via a wired connection.

FIG. 6b, in contrast, describes an embodiment of the device 600', which is very similar to the device 600 and wherein communication between the central control unit 210 and decentralized control units is implemented, for example, via a radio link. Corresponding features in the devices 600 and 600' are designated by the same reference numerals and will not be explained once again here. Rather, the reader is referred to the explanations given for the device 600.

FIG. 6c illustrates that in the device 600' in accordance with an embodiment of the invention, it is possible to add or remove an energy storage component 640a and the associated energy storage terminal 630a and the corresponding coupling mechanism 620. This is enabled, or facilitated, by the wireless connection, described in FIG. 6b, of the central control unit 210 with the decentralized control units 226a-c. The devices 600 and 600' described here are therefore particularly advantageous in terms of implementing a scalable energy storage system.

7. Embodiment of FIG. 7

Figure 7:
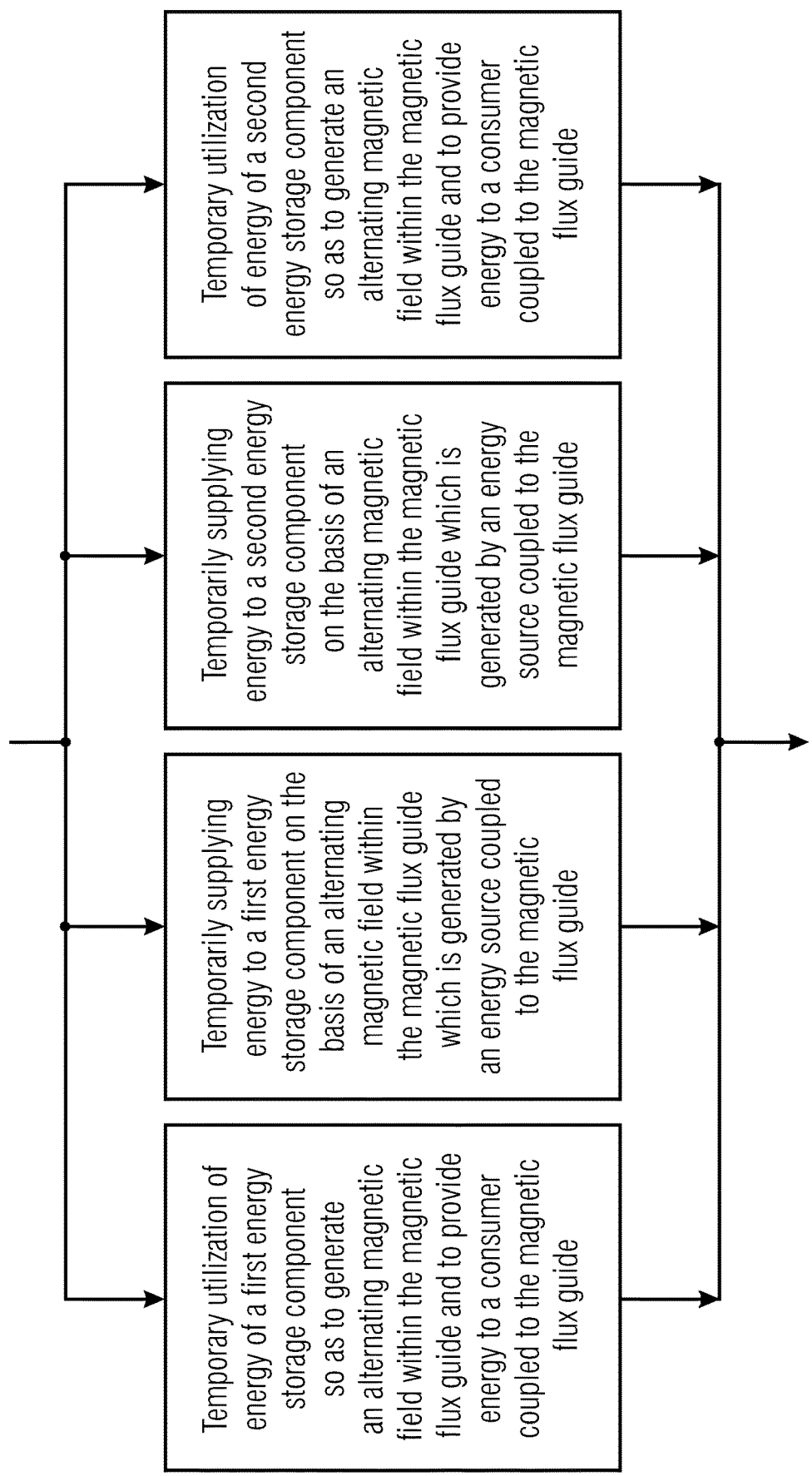
FIG. 7 shows a schematic representation of a method in accordance with an embodiment of the invention.

FIG. 7 illustrates an embodiment of a method in accordance with the invention. In the method illustrated in FIG. 7, a possible temporal cause of supplying and using energy is depicted. Here, energy may be withdrawn from a first energy storage component and a second energy storage component simultaneously or in temporal sequence so as to generate an alternating magnetic field within the shared flux guide. In addition, energy may be supplied to the first energy storage component or to the second energy storage component simultaneously or in temporal sequence, on the basis of the alternating magnetic field within the magnetic flux guide. The order of the steps described is irrelevant to the method described here, which is why the method offers a particularly high level of flexibility regarding supply of energy to or withdrawal of energy from energy storage components.

8. Embodiment of FIG. 8

Figure 8:
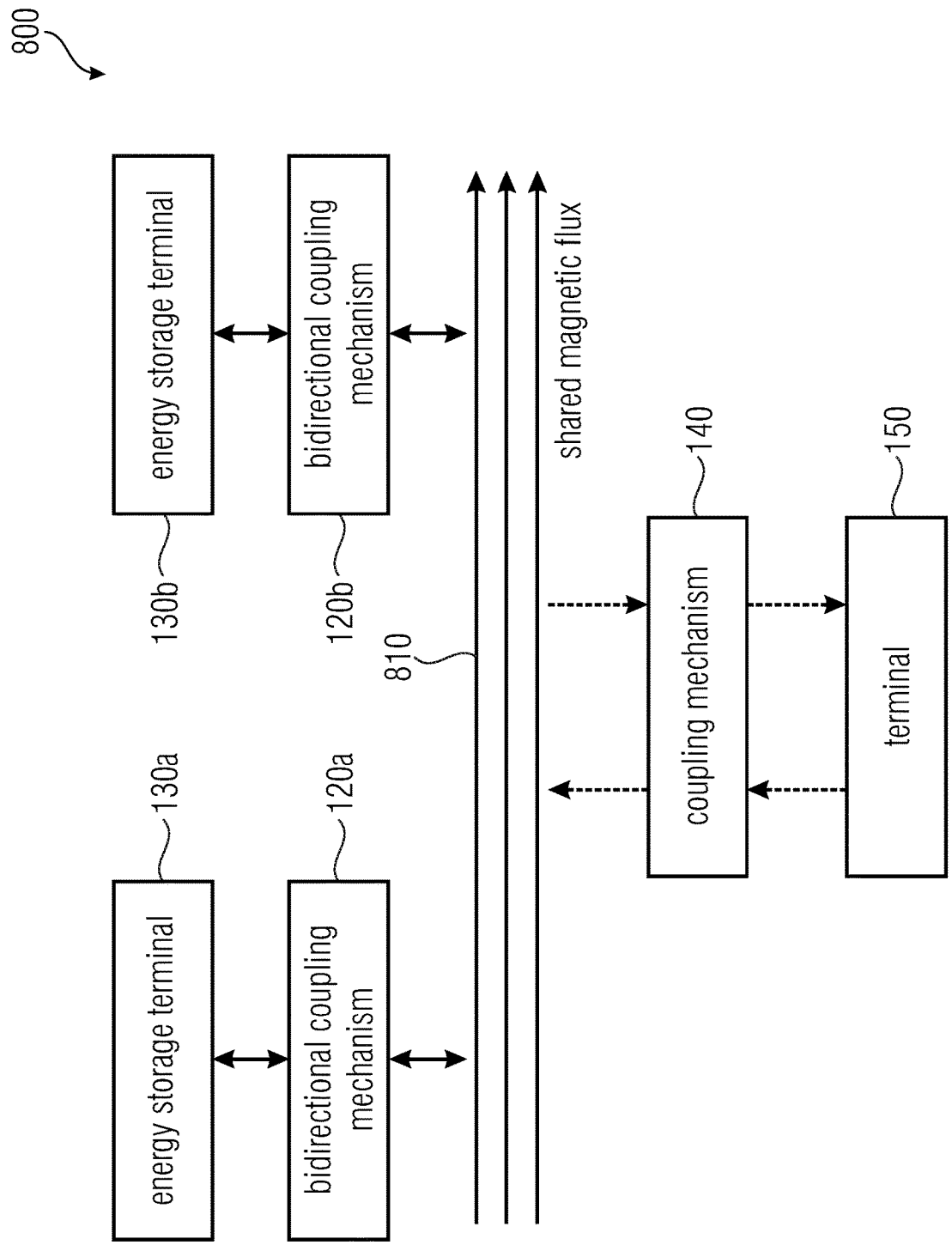
FIG. 8 shows a schematic representation of a further embodiment of the invention.

FIG. 8 shows a schematic representation of a further embodiment of the present invention.

The device 800 of FIG. 8 differs only marginally from the device 100 of FIG. 1. Therefore, identical features are designated by identical reference numerals here.

An essential difference from the device 100 of FIG. 1 consists in that in the device 800 of FIG. 8, there is not necessarily a shared magnetic flux guide. Rather, it is generally sufficient for the energy storage terminals 130a, 130b and for the further terminal 150 to be coupled to a shared magnetic flux 810 by means of corresponding coupling mechanisms. A shared magnetic flux guide is not mandatory for this purpose. Rather, e.g., corresponding coupling coils, which may form part of the coupling mechanisms, may be coupled to a shared magnetic flux via the free field.

Alternatively, for example, the various energy storage terminals may be coupled to respective flux guide portions via respective coupling mechanisms. Details on this will be explained with regard to FIG. 9.

9. Embodiment of FIG. 9

Figure 9:
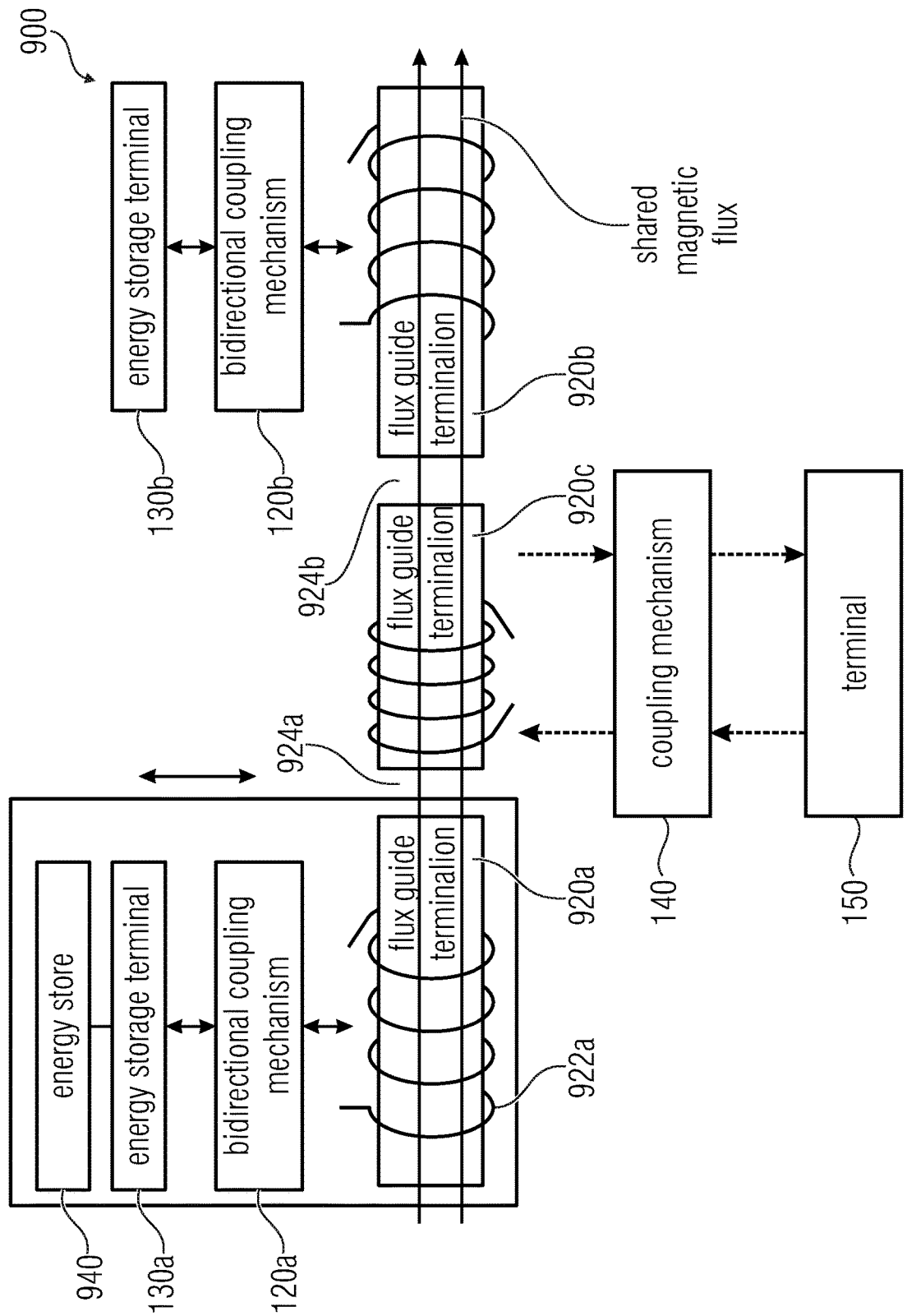
FIG. 9 shows a schematic representation of a further embodiment of the invention.

FIG. 9 shows a schematic representation of a further embodiment of the present invention.

The device 900 of FIG. 9 differs only marginally from the device 100 of FIG. 1. Therefore, identical features are designated by identical reference numerals here.

In the device 900 of FIG. 9, the first energy storage terminal 130a is coupled to a first flux guide portion 920a (or to a first coupling inductance wound onto the first flux guide portion) via a first bidirectional coupling mechanism 120a. The second energy storage terminal 130b is coupled to the second flux guide portion 920b (or to a second coupling inductance wound onto the second flux guide portion) via the second bidirectional coupling mechanism 120b. The further terminal 150 is coupled to a third flux guide portion 920c (or to a third coupling inductance wound onto the third flux guide portion) via the further coupling mechanism 140.

In an operating state, the flux guide portions 920a, 920b, 930c may form a shared magnetic flux guide; it is possible, however, for gaps 924a, 924b to exist between the flux guide portions. However, the "shared" magnetic flux guide here is not made of one piece but is composed of several separable portions.

For example, it is possible to remove the first flux guide portion 920a together with the associated first bidirectional coupling mechanism 120a and the associated first energy storage terminal 130, and advantageously also together with an energy store connected to the first energy storage terminal, during operation of the device 900 (i.e., while there is the shared magnetic flux). In this context it is not necessary, for example, to disconnect cable connections since, e.g., the entire block including the first flux guide portion 920a, the first bidirectional coupling mechanism 120a, the first energy storage terminal 130a, and the first energy storage (not drawn) is coupled to the other units of the device 900 via the shared magnetic flux only. To this end, the device 900 may also be mechanically implemented such that the block mentioned may be removed, or replaced, during operation without removing any safety-relevant covers. Thus, it is possible to exchange an energy store together with the associated coupling mechanism and the associated flux guide portion.

One embodiment thus includes a device 900 for supplying energy to a plurality of energy storage components and for providing energy stored within the energy storage components, comprising a first energy storage terminal for connecting a first energy storage component, a second energy storage terminal for connecting a second energy storage component, and a further terminal 150 for supplying and/or providing energy. The device also includes a first coupling mechanism 120a configured to bidirectionally couple the first energy storage terminal to a shared magnetic flux, a second coupling mechanism 120b configured to bidirectionally couple the second energy storage terminal to the shared magnetic flux, and a further coupling mechanism 140 configured to couple the further terminal to the shared magnetic flux. The device comprises galvanic separation of the first energy storage terminal and of the second energy storage terminal as well as of the further terminal. The device is configured such that coupling and removal of energy storage components, together with an associated coupling mechanism, to/from the shared magnetic flux is possible during operation. The device is configured such that coupling or removal may be effected while an exchange of energy continues to exist between one or more energy storage components via the shared magnetic flux. Coupling may be achieved, for example, in that a corresponding portion of the magnetic flux guide (e.g., mechanically together with the respective coupling mechanism and the respective energy storage component) is led to that area where there is the shared magnetic flux. Removal may be effected, for example, in that a corresponding portion of the magnetic flux guide (e.g., mechanically together with the respective coupling mechanism and the respective energy storage component) is moved away from that area where there is the shared magnetic flux.

It is thus (optionally) possible with said design to remove a memory module (energy storage component) without disconnecting any electrical contact. To this end, the core is not located on a shared core but is located within the magnetic field (inductive coupling) of the remaining structure (e.g., within the shared magnetic flux). It may thus be removed from the system at any time since there has never been any mechanical connection (cable or the like).

Quite generally, also in the other embodiments described herein, a shared magnetic flux may replace the above-described shared magnetic flux guide. For example, it is sufficient for the magnetic field to which the coupling mechanisms are coupled to be shared. The iron core of the coil(s) might be implemented separately, however.

In the embodiments described herein, therefore, it also possible to utilize separate magnetic cores instead of the above-described shared magnetic flux guide. Thus, it is (optionally) possible to not only electrically disconnect to the coil, but it is also possible to remove the coil along with the module (e.g., with the coupling mechanism and, possibly, with a portion of a magnetic flux guide) (i.e., without interrupting any electrical contact).

This may be seen, e.g., in FIG. 9, where the coil 922a with the remaining structure 920a, 120a, 130a, 940 is removed/added.

10. Further Aspects and Conclusion

In the following, several considerations and findings shall be set forth that were taken into account in developing the concept of the invention.

For storing electrical energy, a galvanic cell (battery cell) may be used. However, such a cell typically has low voltage and sometimes also low current. This means that several cells may be combined to form a battery so as to generate higher voltage or a larger current.

Several methods have been applied for connecting the individual battery cells. However, many of them can be achieved only with a large amount of expenditure. In addition, the storage system ceases to function if only one serial element fails, in contrast to some embodiments in accordance with invention.

Large currents can no longer be switched with simple switching elements (e.g., MOSFETs (metal-oxide-semiconductor field effect transistor)), and given high voltages, sufficient insulation must be ensured. Those two points may increase the cost for electric components.

Large direct currents and/or high direct voltages may be considered to be critical in terms of safety. On the one hand, there is the problem that arcs tear less easily when there is a direct current. On the other hand, specific norms and regulations must be complied with as of specific boundary values.

The state of charge of a battery may be determined by means of the amount of open-circuit voltage. If the battery is in operation, i.e., if current is flowing, this voltage value will change. As a result, expensive models of battery cells must be developed so as to obtain information about the state of charge.

The string of cells is restricted to the capacity of the poorest cell because of the serial electrical connection. This means that in contrast to some embodiments in accordance with the invention, the overall system can also output no more power as soon as the poorest cell can provide no more charge.

Some Comparative Examples will be Described Below.

Connecting small galvanic cells to a powerful battery system is effected, in some comparative examples, by means of serial, possibly also parallel, electrical wiring by means of electrical conductors (copper cables).

To achieve a good connection, the battery cells are welded or soldered in some cases. Accordingly, replacement involves a large amount of expenditure. In some comparative examples, the battery will no longer be operational or will be operational to a very limited extent only in case a battery cell or a battery segment is removed.

In some comparative examples, specific components are sometimes used for wiring, and care is taken to ensure a high degree of insulation. Safety constraints specified in standards may be applied. The state of charge is determined by means of a complex battery model which is capable, together with a current sensor, of detecting the state of charge.

My means of so-called active balancing, the power, or capacity, of the poorest cell may be compensated for in relation to the remaining battery system. However, with conventional battery systems, this variant of balancing is clearly more expensive and more time-consuming than the alternative, which is passive balancing, which is why it is hardly employed. As a rule, by means of passive balancing, imbalances are prevented from accumulating during operation. However, the power of the battery system remains limited to the power of the poorest cell.

Further embodiments, or features or aspects which may be added individually or in combination to the embodiments described herein, will be described below.

Embodiments in accordance with the invention achieve combination of power (e.g. of several energy storage components) by means of magnetic coupling on an iron core (or, generally, on a magnetic flux guide) by means of several coils. In addition, some embodiments in accordance with the invention achieve subdivision of the battery voltage levels by means of a dedicated terminal on a transformer. Moreover, embodiments in accordance with the invention are not limited to on-board supply in automotive applications. Furthermore, embodiments in accordance with the invention include systems comprising a shared transformer.

Some embodiments in accordance with the invention enable many individual cells of a battery to be combined via magnetic coupling, which renders active or passive balancing redundant in some cases and by means of which large direct currents or high direct voltages may be avoided.

In addition, some embodiments in accordance with the invention serve both to charge and to discharge a battery, whereby they provide a bidirectional system which makes balancing redundant in some cases. Moreover, some embodiments in accordance with the invention describe systems wherein cells are not electrically coupled in series. Additionally, embodiments in accordance with the invention describe advantageous subdivision of a battery. Moreover, embodiments in accordance with the invention describe systems combining many cells of a battery via magnetic coupling, which renders active or passive balancing redundant in some cases and by means of which large direct currents or high direct voltages may be avoided. Furthermore, embodiments in accordance with the invention include systems providing a storage.

Embodiments in accordance with the invention describe a battery storage which circumvents at least some of the above-mentioned problems in that the cells or arrays of cells are not connected electrically but magnetically by means of a transformer. Since magnetic coupling of the energies of the individual batteries is possible advantageously with changing currents, a control unit may be interposed, for example (e.g. between the energy storage terminals and the magnetic flux guide). This gives the impression of involving more expenditure but offers many advantages that may clearly outweigh the disadvantages.

These advantages which may be implemented individually or in combination in some embodiments are as follows:
- Individual battery cells and/or arrays of cells may be removed or replaced, even during operation.
- Different batteries may be employed (manufacturer, capacity, voltage, degree of aging, etc.).
- The power of each cell segment is fully exploited.
- By means of a short pause of a segment, its no-load voltage and, consequently, its degree of charge may be determined.
- Nowhere in the system do large direct currents and/or high direct voltages occur.
- If communication (which may be kept very simple: e.g., it is possible to send only a target power to the control units) of the control units to the energy management takes place via radio, a battery segment will be coupled to the (remaining) battery system in a completely wireless manner via the magnetic field (e.g. the magnetic flux guide) and/or the radio connection. It may thus be designed such that no electric connection must be cut in order to achieve disconnection.
- The control unit may have a voltage sensor at each of its two terminals (battery and induction coil). In addition, it may invert, or fully disconnect, the connection of the respective poles. Thus, the control unit and/or the battery system may be designed such that upon connection of the battery, the polarity will be recognized and control will be adapted accordingly. Thus, confusion of the poles and, therefore, faulty connection of the battery is unproblematic. Thus, a high security risk during mounting or during replacement of batteries is ruled out.
- The degree of charge of the battery segments (or, generally, of an energy storage component) may be actively adapted to that of the other segments by the control unit (e.g. to those of energy storage components coupled to the magnetic flux guide via other coupling means). In addition to improved exploitation of capacity, this offers a further advantage in terms of efficiency since passive charge balancing via discharging resistances during the charging operation may be dispensed with. Thus, no energy is wasted by discharging resistances, and no additional, unwanted heat is introduced into the battery system.
- The system may be readily supplemented via further coils on the magnetic core or via magnetic fields in close proximity (inductive charging of a vehicle, inclusion of other consumers (on-board network, home DC mains supply, etc.) or energy sources (e.g. photovoltaic system) is possible).

A frequency (e.g. a frequency of the alternating magnetic field within the magnetic flux guide) may be variable but may also be set to a target value. Said target value may correspond to the mains frequency (50 Hz) or may be higher than same and may be reduced to the mains frequency by means of interposed closed-loop control/wiring.

A transformer may be a one-phase transformer or a three-phase transformer, it being possible, with the three-phase transformer, for the individual battery induction coils to be integrated at several locations.

In addition to the voltage of the connected battery and to the induction (e.g. the voltage induced within the coil), the control unit may, in accordance with an embodiment of the invention, also monitor the temperature of the battery cell(s) via one or more sensors and may react to the temperature by restricting the power or by switching off the segment.

The control unit (e.g. a decentralized control unit) of the battery induction coils may simultaneously take on battery management tasks, in accordance with an embodiment of the invention. However, one may also employ a separate, local or central battery management unit (control unit).

In accordance with an embodiment of the invention, the control units may be designed such that their energy requirements are covered by the power induced and/or by the battery.

In accordance with an embodiment of the invention, a current sensor is not mandatory but may supplement the control unit.

A system in accordance with an embodiment of the invention may be optimized by using a capacitor in parallel with the battery arrangement and/or by using high frequencies.

In accordance with an embodiment of the invention, it is by measuring the induction voltage that the control units may sense the phase response and may thus adapt their switching behaviors. Alternatively, the signals for the switches are communicated by the energy management, which may also exhibit a sensor for measuring the voltage and/or for measuring the phases.

In accordance with an embodiment of the invention, the battery system presented here may also comprise, in addition to a one-phase transformer, a multi-phase transformer which has several induction circuits connected to it which comprise battery cells.

One embodiment in accordance with the invention achieves that the battery management system and the control unit (inverted rectifier) may be combined.

In embodiments in accordance with the invention, communication may take place via cable connection, e.g. SRI (serial-peripheral interface), CAN (controller area network, e.g. used in the automotive field), etc. or in a wireless manner by means of WLAN (wireless local area network), Bluetooth, NFC (near-field communication) or the like. In addition, communication may take place via the induced voltage itself. To this end, the central energy management system may also be connected to the magnetic core via a dedicated coil.

In embodiments in accordance with the invention, other storage systems (lead acid, NiMH (nickel metal hydride), capacitors, etc.) may also be included in addition to lithium-ion batteries.

Storage systems in accordance with the invention may be designed such that individual coils may be removed or added (also during operation).

Embodiments in accordance with the invention comprise, as a technical feature, a magnetic connection and, thus, galvanic separation of the individual segments of a battery storage system. In particular, for example, the battery cells may be connected to one another via switching and/or control means by means of a coil located on a magnetic core and may be connected to the current source/current sink via an alternating magnetic field. Thus, e.g. less expensive, more reliable, more readily replaceable and actively balanced battery storage systems may be implemented.

Embodiments in accordance with the invention thus enable selective charging or discharging of energy storage components, as a result of which states of charge of energy storage components connected may be adjusted. It is particularly advantageous here that, e.g., no energy must be led from one energy storage component to another in order to achieve adjustment (balancing). In particular, conventional active balancing (transfer of energy from cells having a high state of charge to cells having a lower state of charge) may be made redundant by this. With the system described, active balancing specifically takes place because of the selective charging, as was emphasized in the previous paragraph. However, this has the advantage that the stored energy need not be redistributed in order to homogenize the system.

In accordance with a further embodiment of the invention, the device enables taking into account a state of aging of an energy storage component when withdrawing energy from the energy storage component, so that a discharge current which is adapted to the state of aging is withdrawn from the energy storage component. For example, a smaller amount of discharge current may be withdrawn from an energy storage component having heavy signs of aging. In addition, the device enables charging of an energy storage component to be adapted to the state of aging; for example, a smaller amount of charge current may be supplied to an energy storage component that already exhibits intense signs of aging.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Device for supplying energy to a plurality of energy storage components and for providing energy stored within the energy storage components, comprising:
   a first energy storage terminal for connecting a first energy storage component;
   a second energy storage terminal for connecting a second energy storage component;
   a further terminal for supplying and/or providing energy;
   a first coupling mechanism configured to bidirectionally couple the first energy storage terminal to the shared magnetic flux;
   a second coupling mechanism configured to bidirectionally couple the second energy storage terminal to the shared magnetic flux;
   a further coupling mechanism configured to couple the further terminal to the shared magnetic flux;
   the device comprising galvanic separation of the first energy storage terminal and of the second energy storage terminal as well as of the further terminal;
   the device being configured such that coupling and removal of energy storage components to the shared magnetic flux together with an associated coupling mechanism is possible during operation,
   wherein said coupling involves mechanically guiding a coupling inductance, which is coupled to the first coupling mechanism, to that area wherein there is the shared magnetic flux, together with the first coupling mechanism and the first energy store connected to the first energy storage terminal, and
   wherein said removal involves mechanically guiding the coupling inductance, which is coupled to the first coupling mechanism, away from that area wherein there is the shared magnetic flux, together with the first coupling mechanism and the first energy store connected to the first energy storage terminal;
   the device being configured such that coupling or removal may be performed while an exchange of energy continues to take place between one or more energy storage components via the shared magnetic flux.

2. Device as claimed in claim 1, the device being configured to enable removing of a first flux guide portion together with the first coupling mechanism and the first energy storage terminal and the first energy storage component connected to the first energy storage terminal while there is the shared magnetic flux,
   the first flux guide portion being part, during operation, of a shared magnetic flux guide comprising several separable portions.

3. Device as claimed in claim 1,
   wherein said coupling involves mechanically guiding a coil, which is coupled to the first coupling mechanism, to that area wherein there is the shared magnetic flux, together with a portion of a magnetic flux guide, the first coupling mechanism and the first energy store connected to the first energy storage terminal, and
   wherein said removal involves mechanically guiding a coil, which is coupled to the first coupling mechanism, away from that area wherein there is the shared magnetic flux, together with the first coupling mechanism and the first energy store connected to the first energy storage terminal.

4. Device for supplying energy to a plurality of energy storage components and for providing energy stored within the energy storage components, comprising:
   a first energy storage terminal for connecting a first energy storage component;
   a second energy storage terminal for connecting a second energy storage component;
   a further terminal for supplying and/or providing energy;
   a first coupling mechanism configured to bidirectionally couple the first energy storage terminal to the shared magnetic flux;
   a second coupling mechanism configured to bidirectionally couple the second energy storage terminal to the shared magnetic flux;
   a further coupling mechanism configured to couple the further terminal to the shared magnetic flux;
   the device comprising galvanic separation of the first energy storage terminal and of the second energy storage terminal as well as of the further terminal;
   wherein the first or second coupling mechanism comprises a sensor configured to sense a voltage or a current of an energy storage component;
   the device being configured to temporarily decouple one of the energy storage components during operation by means of the first coupling mechanism or the second coupling mechanism, and
   to measure, during a decoupled state of the first energy storage component or of the second energy storage component and during operation, an open-circuit voltage and/or an internal resistance of the energy storage component while an exchange of energy continues to exist between one or more other energy storage components and the alternating magnetic field, and to determine, on the basis of said measurement, a state of charge or a state of conservation of the decoupled energy storage component; or to measure, during decoupling of the first energy storage component or of the second energy storage component and during operation, an open-circuit voltage and/or an internal resistance of the energy storage component while an exchange of energy continues to exist between one or more other energy storage components and the alternating magnetic field, and to determine, on the basis of said measurement, a state of charge or a state of conservation of the decoupled energy storage component.

5. Device as claimed in claim 4, the device being configured to measure, during a decoupled state of the first energy storage component or of the second energy storage component and during operation, the internal resistance of the energy storage component while an exchange of energy continues to exist between one or more other energy storage components and the alternating magnetic field, and to determine, on the basis of said measurement, a state of charge or a state of preservation of the decoupled energy storage component; or to measure, during decoupling of the first energy storage component or of the second energy storage component and during operation, the internal resistance of the energy storage component while an exchange of energy continues to exist between one or more other energy storage components and the alternating magnetic field, and to determine, on the basis of said measurement, a state of charge or a state of preservation of the decoupled energy storage component.

6. Device for supplying energy to a plurality of energy storage components and for providing energy stored within the energy storage components, comprising:

a first energy storage terminal for connecting a first energy storage component;

a second energy storage terminal for connecting a second energy storage component;

a further terminal for supplying and/or providing energy;

a shared magnetic flux guide;

a first coupling mechanism configured to bidirectionally couple the first energy storage terminal to the shared magnetic flux guide;

a second coupling mechanism configured to bidirectionally couple the second energy storage terminal to the shared magnetic flux guide;

a further coupling mechanism configured to couple the further terminal to the shared magnetic flux guide;

the device comprising galvanic separation of the first energy storage terminal and of the second energy storage terminal as well as of the further terminal;

wherein the first coupling mechanism and/or the second coupling mechanism and/or the further coupling mechanism comprise(s) DC voltage circuit/AC voltage circuit coupler configured to couple a respective DC voltage energy storage component to a respective coil which is arranged on the shared magnetic flux guide, and which has an alternating voltage induced therein or through which an alternating current flows during operation;

the device comprising a control unit configured to provide control signals for the DC voltage circuit/AC voltage circuit coupler, wherein the control unit is configured to specify, by means of the control signals, a direction of a flow of energy within the first coupling mechanism or within the second coupling mechanism from a respective energy storage component toward the magnetic flux guide, or vice versa, and to adapt the control signals to a frequency of an alternating magnetic field which has been generated or is to be generated within the magnetic flux guide;

the device comprising a plurality of decentralized control units, each of which is configured to control an individual one of the coupling mechanisms or to control a group of coupling mechanisms; and the device comprising a central control unit configured to coordinate functions of the decentralized control units;

the device comprising coupling of the control units by means of magnetic induction via the shared magnetic flux guide, for transmitting control signals between the central control unit and the decentralized control units.

\* \* \* \* \*